(12) United States Patent
Han

(10) Patent No.: US 11,247,153 B2
(45) Date of Patent: Feb. 15, 2022

(54) FILTER MODULE FOR GRAVITY-TYPE WATER PURIFIER AND GRAVITY-TYPE WATER PURIFIER INCLUDING SAME

(71) Applicant: AMOGREENTECH CO., LTD., Gimpo-si (KR)

(72) Inventor: Kyung Gu Han, Goyang-si (KR)

(73) Assignee: AMOGREENTECH CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/344,255

(22) PCT Filed: Oct. 27, 2017

(86) PCT No.: PCT/KR2017/011970
§ 371 (c)(1),
(2) Date: Apr. 23, 2019

(87) PCT Pub. No.: WO2018/080219
PCT Pub. Date: May 3, 2018

(65) Prior Publication Data
US 2019/0247772 A1 Aug. 15, 2019

(30) Foreign Application Priority Data

Oct. 27, 2016 (KR) .......................... 10-2016-0141188
Apr. 17, 2017 (KR) .......................... 10-2017-0049280

(51) Int. Cl.
*B01D 35/30* (2006.01)
*B01D 63/08* (2006.01)
(Continued)

(52) U.S. Cl.
CPC ............. *B01D 35/30* (2013.01); *B01D 35/00* (2013.01); *B01D 63/08* (2013.01); *B01D 69/06* (2013.01); *C02F 1/00* (2013.01); *C02F 1/44* (2013.01)

(58) Field of Classification Search
CPC .... B01D 29/39; B01D 69/06; B01D 2315/06; B01D 63/082; B01D 35/34; B01D 23/02; B01D 23/20; B01D 23/28; C02F 2307/10
(Continued)

(56) References Cited

U.S. PATENT DOCUMENTS 963,324 A * 7/1910 Randall
2004/0011721 A1 1/2004 Pelofi et al.
(Continued)

FOREIGN PATENT DOCUMENTS

JP 19930276053 4/1995
JP 11090119 4/1999
(Continued)

OTHER PUBLICATIONS

International Search Report and Written Opinion Issued in Corresponding PCT Application No. PCT/KR2017/011970, dated Feb. 23, 2018.

*Primary Examiner* — Benjamin M Kurtz
(74) *Attorney, Agent, or Firm* — Norton Rose Fulbright US LLP

(57) ABSTRACT

Provided is a filter module for a gravity-type water purifier. The filter module for a gravity-type water purifier according to an exemplary embodiment of the present invention includes: a plurality of filter members which are plate shaped, and which are fixed to each other via one or more fastening bars while arranged spaced apart from each other in parallel having gaps therebetween; and a common water collecting member coupled to the respective water collecting holes formed in the filter members, and in which filtered water produced from the filter members is collected.

15 Claims, 27 Drawing Sheets

(51) Int. Cl.
*B01D 69/06* (2006.01)
*C02F 1/00* (2006.01)
*C02F 1/44* (2006.01)
*B01D 69/12* (2006.01)
*B01D 35/00* (2006.01)

(58) Field of Classification Search
USPC .................................. 210/128, 461, 464, 467
See application file for complete search history.

(56) References Cited

U.S. PATENT DOCUMENTS

| | | | |
|---|---|---|---|
| 2015/0284260 A1* | 10/2015 | Huda | C02F 1/003 210/128 |
| 2015/0329381 A1* | 11/2015 | Kitanaka | B01D 61/18 210/209 |

FOREIGN PATENT DOCUMENTS

| | | |
|---|---|---|
| KR | 10-1998-0037661 | 11/2000 |
| KR | 20-0283490 | 7/2002 |
| KR | 10-0459037 | 11/2004 |
| KR | 10-2008-0098115 | 11/2008 |
| KR | 10-2009-0037557 | 4/2009 |
| KR | 10-2010-0000200 | 1/2010 |
| KR | 10-2010-0028011 | 3/2010 |
| KR | 10-2011-0139692 | 12/2011 |
| KR | 10-2012-0133600 | 12/2012 |
| KR | 10-2014-0103866 | 8/2014 |
| KR | 10-2015-0011745 | 2/2015 |
| KR | 10-2017-0027682 | 3/2017 |
| WO | WO-2014010554 A1 * | 1/2014 ............ C02F 3/1273 |

* cited by examiner (a)

(b)

FILTER MODULE FOR GRAVITY-TYPE WATER PURIFIER AND GRAVITY-TYPE WATER PURIFIER INCLUDING SAME

CROSS-REFERENCE TO RELATED APPLICATIONS

This application is a national phase application under 35 U.S.C. § 371 of International Application No. PCT/KR2017/011970, filed Oct. 27, 2017, which claims priority to and the benefit of Korean Patent Applications No. 10-2016-0141188, filed Oct. 27, 2016, and No. 10-2017-0049280, filed Apr. 17, 2017. The contents of the referenced patent applications are incorporated into the present application by reference.

FIELD OF THE DISCLOSURE

The present invention relates to a water purifier, and more particularly, to a gravity-type water purifier capable of filtering raw water using gravity.

BACKGROUND

A supply of clean and safe water is essential for human health and survival. In Africa and developing countries, however, the supply of clean water is not sufficient, and therefore, contaminated ponds and standing pools of water are frequently used as drinking water.

Drinking contaminated water can cause various infectious diseases due to microorganisms contained in the contaminated water. That is, there is a problem of causing illness such as abdominal pain, diarrhea, vomiting, and the like, and, in the worst case, life-threatening problems.

Therefore, in order to prevent the above-described problem, it is important to prevent contamination by microorganisms of the food or water we eat.

When clean water and sufficient food are secured in currently developing countries, the effect of improving environment which can be achieved by supplying clean water to reduce the overall mortality rate may be far greater than the development in medical science or therapy.

However, since a conventional water purifier purifies raw water with the principle that a predetermined water pressure is applied to the raw water to allow the raw water to pass through a filter, a pump system capable of applying a predetermined water pressure is required and, to this end, an electric power system is also provided. In the absence of the pump system and the electric power system, there is a limitation in that the conventional water purifier cannot be used.

SUMMARY OF THE INVENTION

The present invention is directed to providing a filter module for a gravity-type water purifier, which is applicable to a gravity-type water purifier capable of easily producing filtered water using gravity.

Further, the present invention is directed to providing a gravity-type water purifier capable of easily producing filtered water using gravity even in poor conditions in which power such as electricity is not supplied.

One aspect of the present invention provides a filter module for a gravity-type water purifier, which includes a plurality of filter members formed in a flat plate shape, disposed in parallel to be spaced an interval apart from each other, and fixed to each other via at least one fastening bar and includes a common water collecting member to which water collecting portions formed in each of the plurality of filter members are connected and in which filtered water produced from each of the plurality of filter members is collected.

The filter module for a gravity-type water purifier may further include a weighting member coupled to the at least one fastening bar and configured to increase an overall weight of the filter module for a gravity-type water purifier to allow the filter module for a gravity-type water purifier to be easily sunk therein.

The weighting member may be disposed to surround a lower side of the plurality of filter members.

The weighting member may include a plate-shaped first plate having a predetermined area and a pair of second plates extending upward from both side ends of the first plate, wherein the pair of second plates may be engaged with both end portions of the fastening bar.

A plurality of through-holes may be formed to pass through the weighting member.

The weighting member may be formed of a mesh net having a plurality of through-holes and engaged with the fastening bar to face one surface of the filter member.

Each of the plurality of filter members may include a plate-shaped filtration member having a predetermined area and a support frame coupled to an edge of the filtration member so as to support the filtration member and having a flow path through which filtered water produced through the filtration member flows.

The filtration member may include a plate-shaped first support having a predetermined area and a pair of nanofiber webs configured such that nanofibers are formed on both surfaces of the first support.

Each of the pair of nanofiber webs may include a first nanofiber web having a surface coated with an antimicrobial material and a second nanofiber web stacked on one surface of the first nanofiber web.

A second support may be interposed between the pair of nanofiber webs and the first support.

Another aspect of the present invention provides a gravity-type water purifier including a housing having an inner space in which raw water is stored, and at least one above-described filter module disposed in the inner space to filter foreign materials contained in the raw water, wherein the raw water may flow into the plurality of filter members due to gravity and the foreign materials may be filtered such that filtered water is produced.

The housing may include a cover configured to open or close an open upper portion of the inner space.

The cover may include at least one input hole formed to pass through the cover with a predetermined area so as to supply the raw water to the inner space and a mesh strainer configured to filter the foreign materials contained in the raw water may be disposed above the at least one input hole.

The housing may include a first housing having a first space in which the raw water is stored and the at least one filter module is disposed and a second housing having a second space in which the filtered water produced through the at least one filter module is stored, and the at least one filter module may be connected to an an outlet formed on a bottom surface of the first housing such that the filtered water discharged through the outlet is stored in the second space.

A fastener formed to protrude from an inner surface of the housing to prevent movement of the at least one filter module may be provided in the first space.

An opening in which the outlet is disposed may be formed on an upper portion of the second housing, and the outlet is opened or closed by an opening and closing part which is pivoted according to a water level of the filtered water stored in the second space.

The opening and closing part may include a buoyancy member pivotably coupled to the outlet via a link member to ascend or descend according to the water level of the filtered water and a sealing member connected to an end portion of the link member.

A plurality of filter modules may be provided and disposed in the inner space, and common water collecting members included in each of the plurality of filter modules may be connected one-to-one to a single filtered water collecting member. In this case, the housing may be a rainwater storage tank.

Still another aspect of the present invention provides a gravity-type water purifier including a housing including a first housing having a first space in which raw water is stored and a second housing having a second space in which filtered water produced from the raw water is stored and including at least one filter member disposed in the first space so as to filter foreign materials contained in the raw water and detachably connected to an outlet formed to pass through a bottom surface of the first space, wherein the at least one filter member produces the filtered water from the raw water using gravity, and the filtered water falls to the second space through the outlet.

The at least one filter member may include a hollow case including an inner wall and an outer wall which are disposed to be spaced an interval apart from each other, a plate-shaped filtration member disposed between the inner wall and the outer wall, and a hollow protrusion formed to protrude from a lower end of the hollow case and detachably coupled to the outlet, wherein the filtered water produced through the at least one filter member may flow into a hollow portion of the hollow case and then fall to the second space through the outlet.

In accordance with a gravity-type water purifier according to the present invention, filtered water can be produced easily using gravity even in poor conditions in which power such as electricity is not supplied such that clean water can be obtained even in the poor conditions.

Further, since a filter module can be sunk smoothly through a weighting member, the filter module can be efficiently applied to the gravity-type water purifier and clean filtered water can be smoothly obtained.

Consequently, there is an advantage of being capable of reducing installation and maintenance costs for a separate water purification facility. Further, there is an advantage of being capable of preventing illness occurring due to intake of contaminated water to improve quality of life.

DETAILED DESCRIPTION OF THE INVENTION

Figure 1:
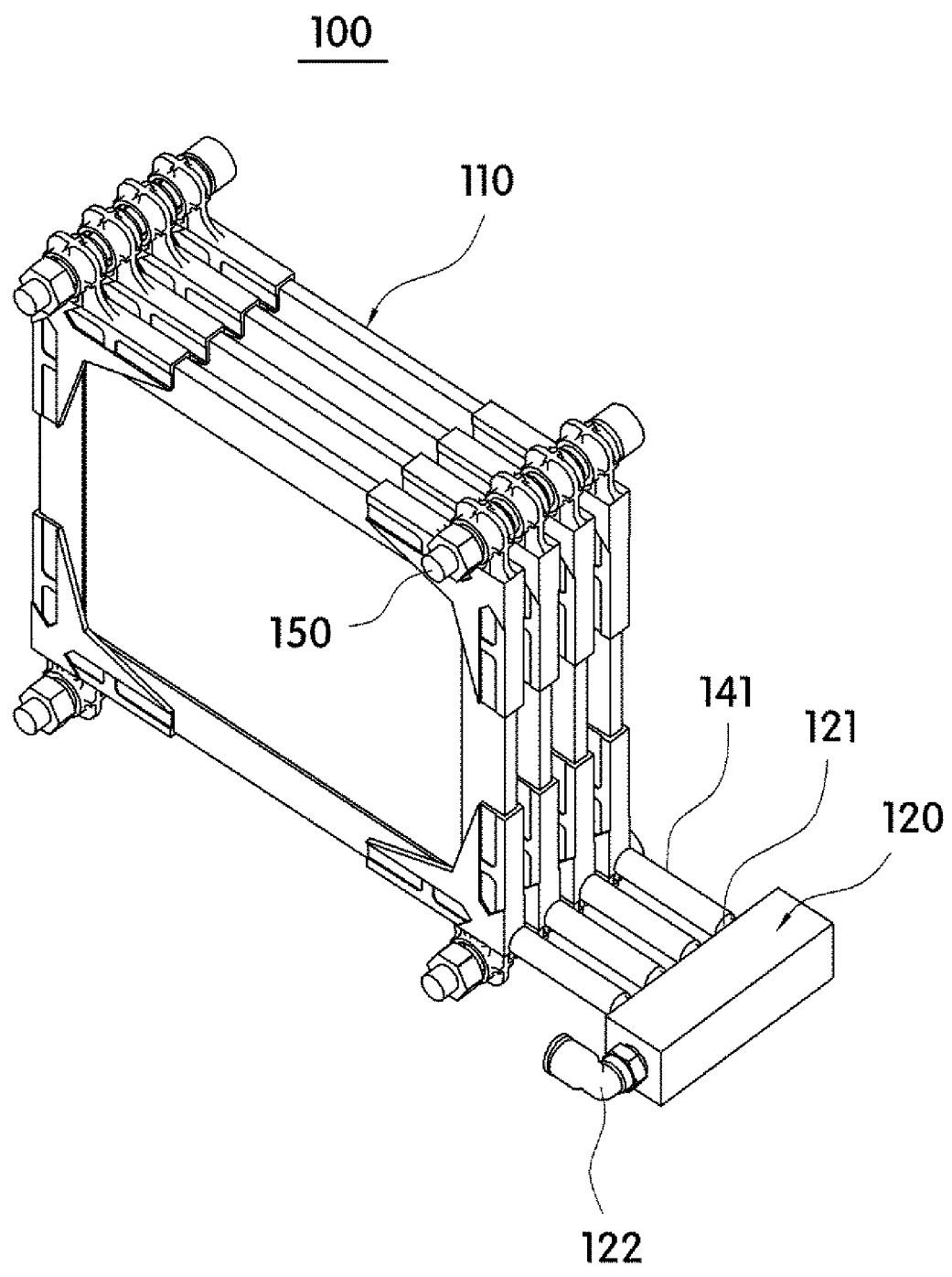
FIG. 1 is a diagram illustrating a filter module for a gravity-type water purifier according to one embodiment of the present invention.

Hereinafter, embodiments of the present invention will be fully described in detail which is suitable for easy implementation by those skilled in the art to which the present invention pertains with reference to the accompanying drawings. The present invention may be implemented in various different forms, and thus it is not limited to embodiments which will be described herein. In the drawings, some portions not related to the description will be omitted in order to clearly describe the present invention, and the same or similar reference numerals will be assigned to the same or similar components throughout this disclosure.

A filter module 100, 200, 300, 400, 500, or 600 for a gravity-type water purifier according to one embodiment of the present invention suctions raw water toward filter members 110 through water pressure due to gravity or potential energy in a state in which the filter module 100, 200, 300, 400, 500, or 600 is partially or entirely sunk in the raw water so that foreign materials contained in the raw water may be removed to produce filtered water.

That is, as shown in FIGS. 15 to 22 and FIG. 25, the filter module 100, 200, 300, 400, or 500 for a gravity-type water purifier according to one embodiment of the present invention is disposed in an inner space S,S1 of a gravity-type water purifiers 1000, 2000, or 3000 in which the raw water is stored, and then the raw water around the filter members 110 may permeate into filtration members 111 due to water pressure resulting from gravity or potential energy such that the filtered water may be produced.

To this end, as shown in FIGS. 1 to 7 and FIGS. 26 and 27, the filter module 100, 200, 300, 400, 500, or 600 for a gravity-type water purifier may include the filter members 110 and a common water collecting member 120.

In this case, the filter module 100, 200, 300, 400, 500, or 600 for a gravity-type water purifier may be modularized so as to be easily disposed in the gravity-type water purifier 1000, 2000, or 3000.

For example, the filter module 100, 200, 300, 400, 500, or 600 may be configured such that the filter members 110 disposed in parallel to be spaced a regular interval apart from each other are fixed via a fastening bar 150. Here, the filter members 110 may each be connected to the common water collecting member 120 through a connecting tube 141. The common water collecting member 120 may be connected to another configuration for discharging produced filtered water (e.g., an outlet 311 formed in a first housing 310, which will be described below, or a filtered water collecting member 420 in FIG. 25) via the connecting tube 141. Thus, the filtered water produced through each of the filter members 110 may be collected through the common water collecting member 120 and then may move to the other configuration for discharging produced filtered water.

Specifically, the filter members 110 may be integrally formed, through a single fastening bar 150 having a predetermined length, in a state of being disposed in parallel. In this case, each of water collecting portions 114 formed on the filter members 110 may be connected one-to-one to the common water collecting member 120 such that the filtered water produced through each of the filter members 110 may be collected in the common water collecting member 120. Here, the filter members 110 may be disposed to be spaced a predetermined interval apart from each other so as to secure a predetermined space between adjacent filtration members 111. Accordingly, raw water that is a target filtration liquid may be introduced to the space between adjacent filtration members 111 so as to surround the filtration members 111. Further, the raw water being present around the filtration members 111 may move inward the filtration members 111 through water pressure due to gravity or potential energy, and simultaneously, filtered water may be produced through each of the filtration members 111. A detailed configuration of each of the filter members 110 will be described below.

The common water collecting member 120 may collect the filtered water produced from each of the filter members 110. That is, the common water collecting member 120 may be connected to at least one water collecting portion 114 formed on each of the filter members 110 such that the filtered water produced from each of the filter members 110 may be collected in a single space.

Further, during a back washing which removes foreign materials attached to the filtration member 111, the common water collecting member 120 may also serve to distribute a high pressure fluid, such as washing water or high pressure air provided from the outside, to each of the filter member 110. Accordingly, even though the filter members 110 fixed to the fastening bar 150 are not separated therefrom, foreign materials attached to each of the filtration members 111 may be removed such that there is an advantage in that cleaning can be facilitated.

Figure 25:
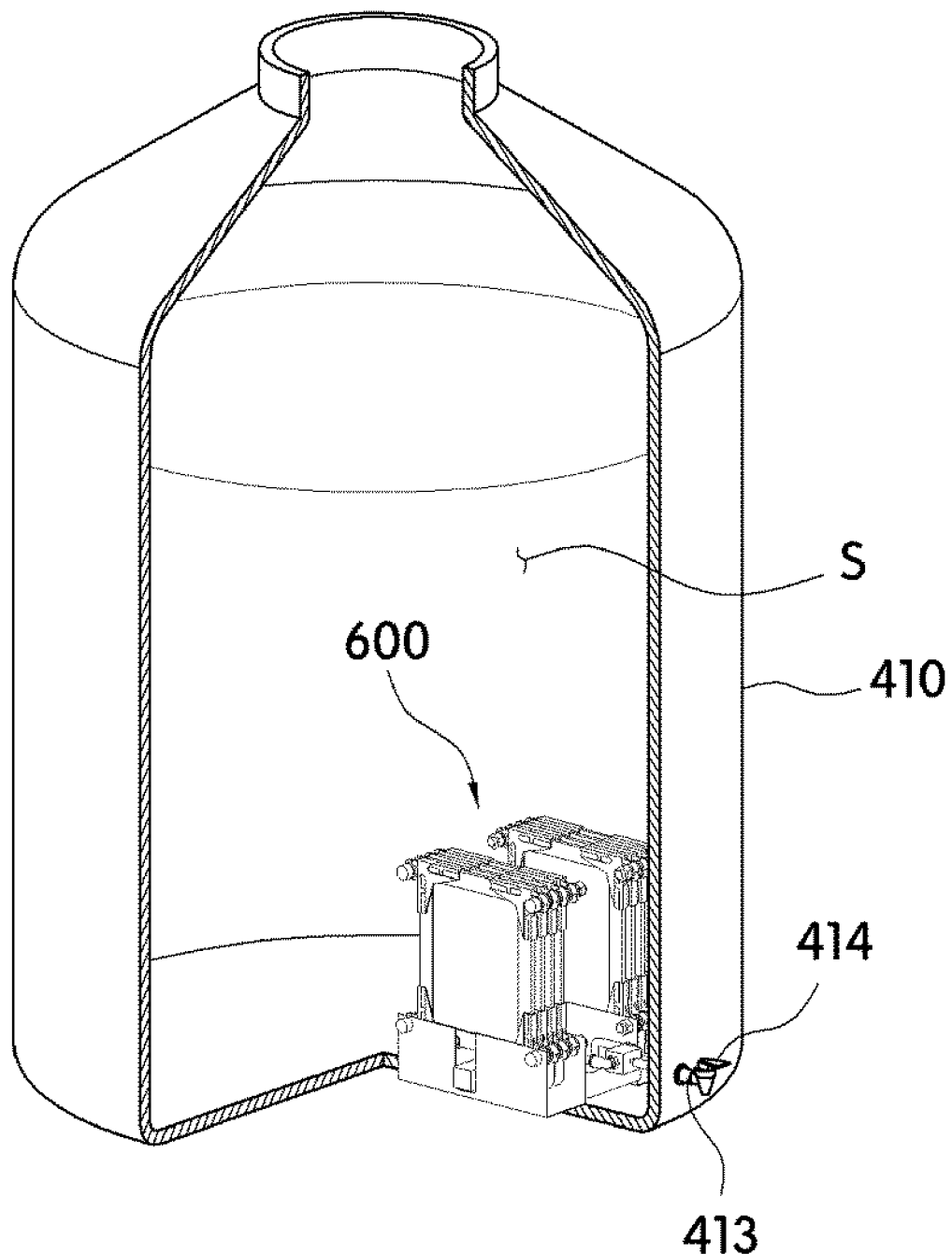
FIG. 25 is a diagram illustrating an incised state of a portion of a housing in a gravity-type water purifier to which a filter module for a gravity-type water purifier in an alternative form is applied.
Figure 26:
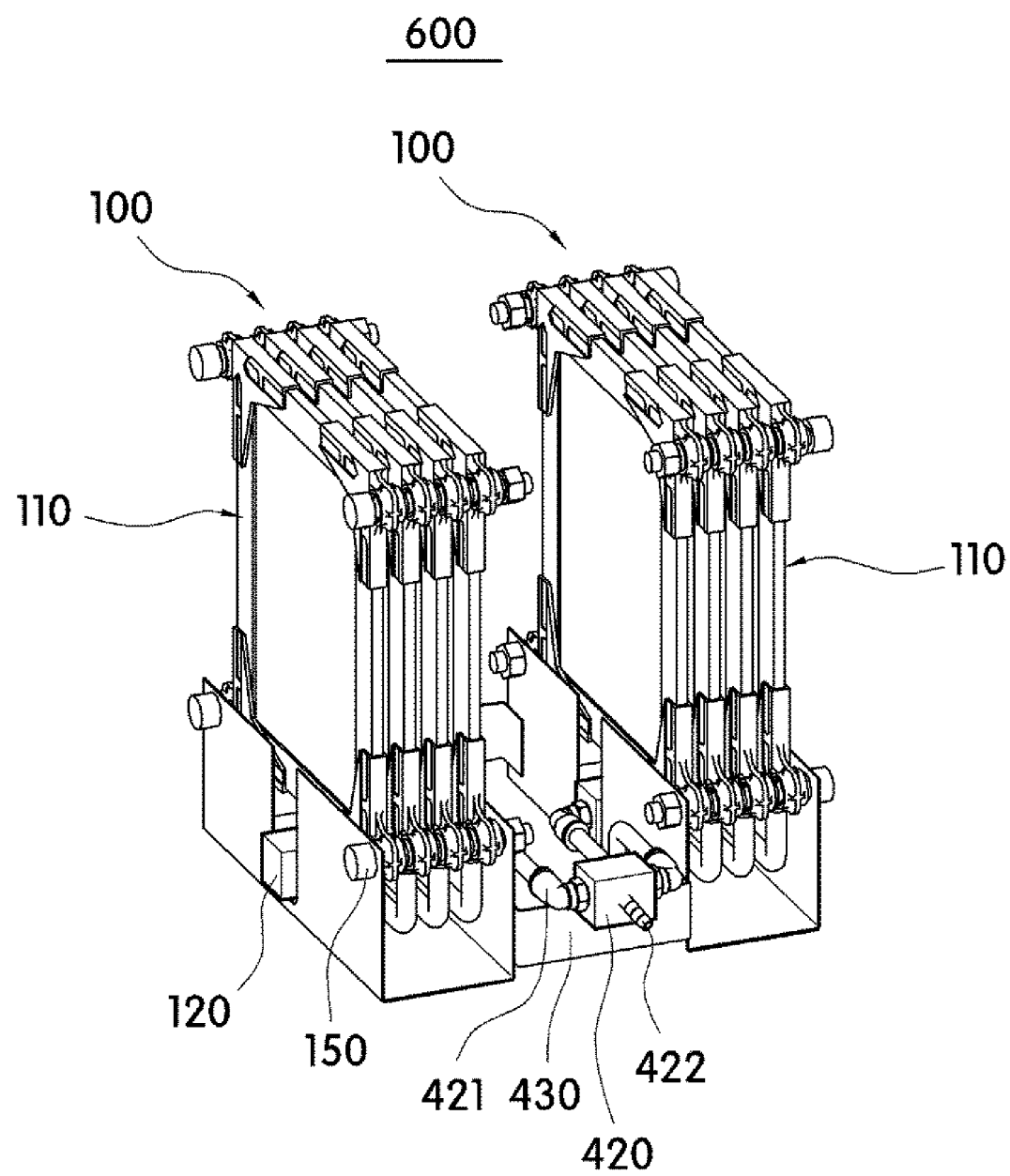
FIG. 26 is a diagram illustrating the filter module for a gravity-type water purifier applied to FIG. 25.
Figure 27:
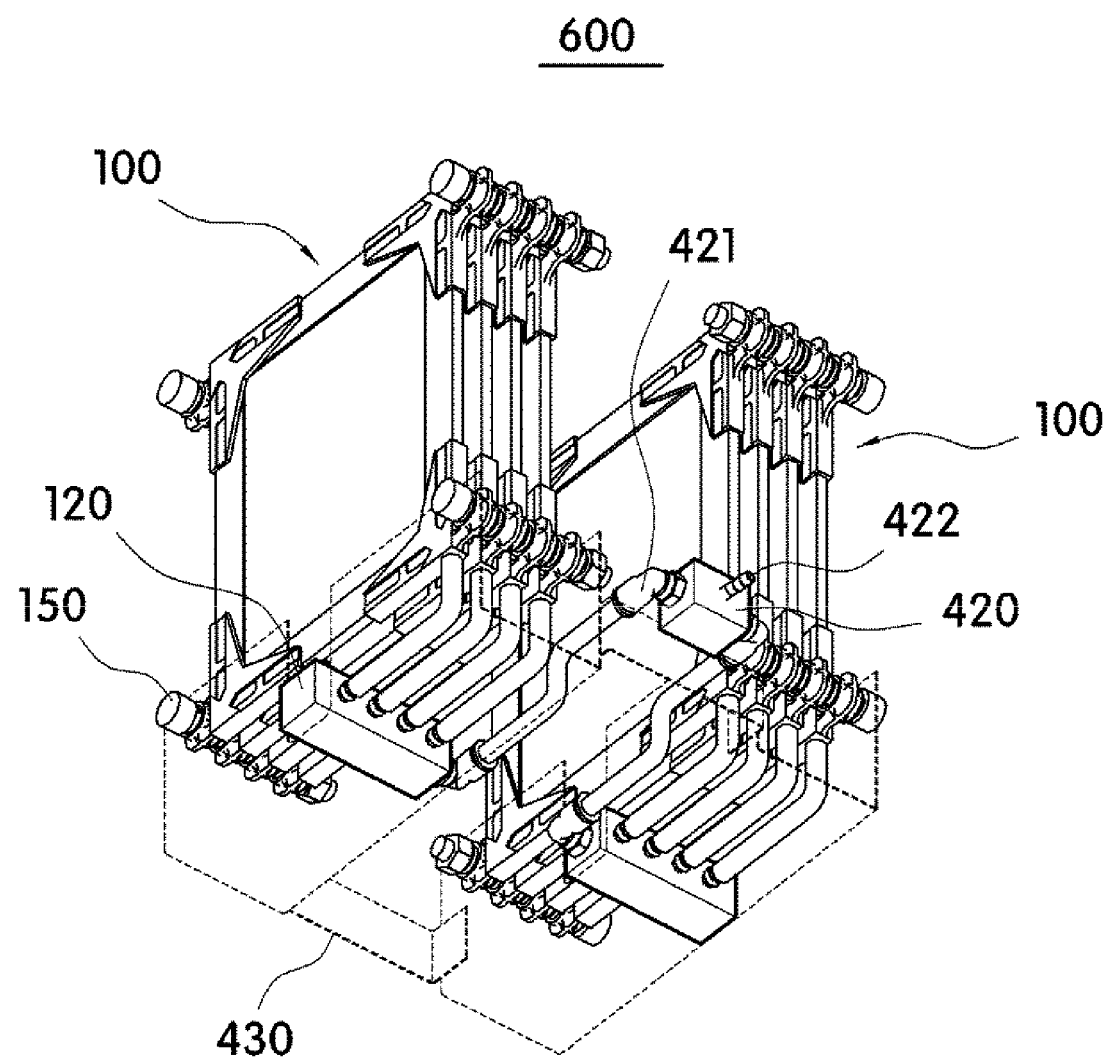
FIG. 27 is a diagram illustrating a state of FIG. 26 when viewed from the bottom.

As shown in FIGS. 1 to 7, in a case in which one water collecting portion 114 is formed on each of the filter members 110, the common water collecting member 120 may be connected to the one water collecting portion 114 formed on each of the filter members 110. Alternatively, as shown in FIGS. 25 to 27, in a case in which a plurality of water collecting portions 114 are formed on each of the filter members 110, the plurality of water collecting portions 114 formed on each of the filter members 110 may be connected to one common water collecting member 120.

However, the present invention is not limited thereto, and it is noted that the number of the common water collecting members 120 may be provided to correspond to a total number of the water collecting portions 114 formed on one filter member 110, and the common water collecting members 120 may be connected one-to-one to each of the water collecting portions 114 formed on the one filter member 110.

To this end, the common water collecting member 120 may include a plurality of inlets 121 connected to each of the water collecting portions 114 and an outlet 122 for discharging filtered water to the outside.

Figure 2:
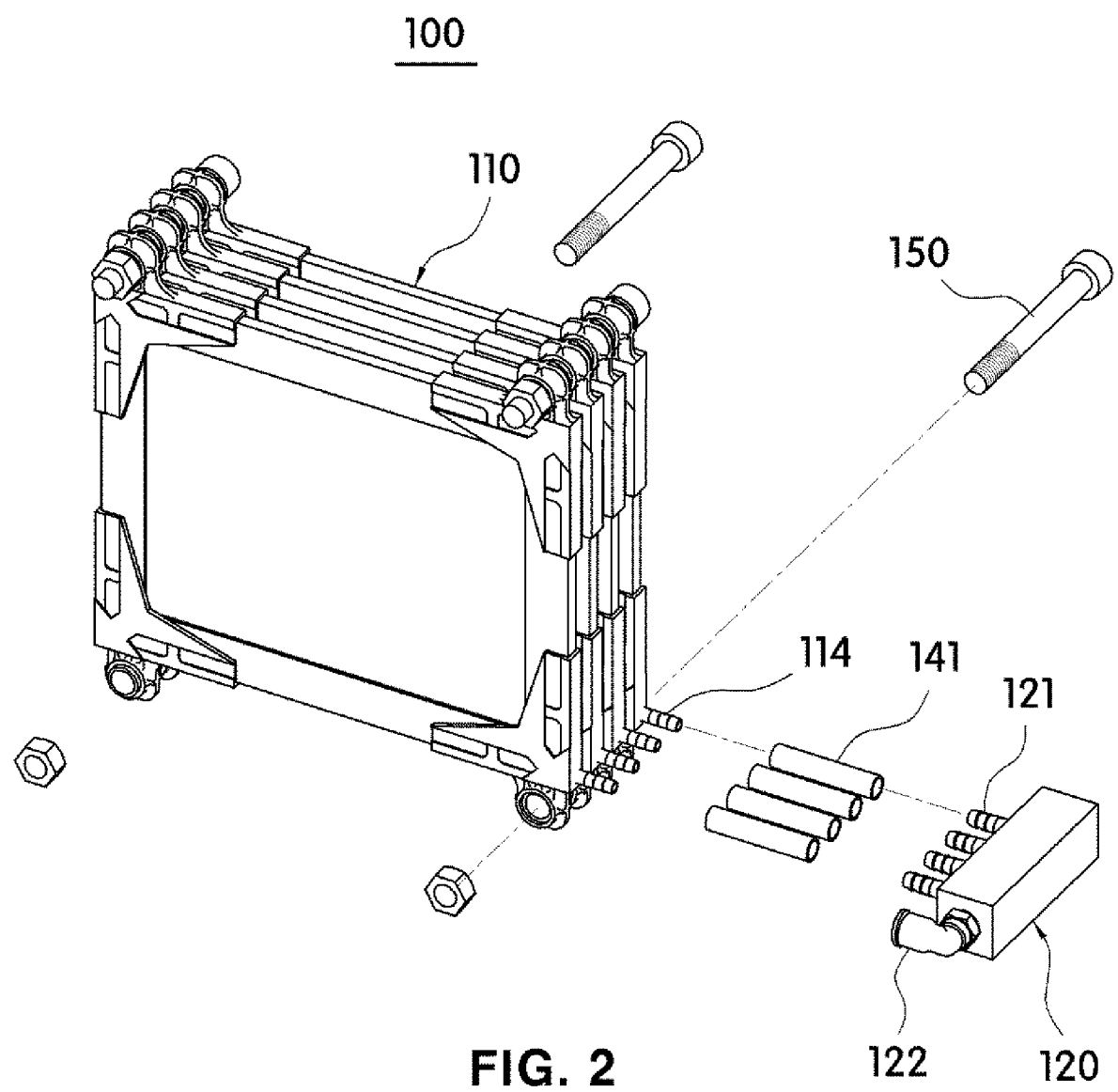
FIG. 2 is a diagram illustrating a state in which a common water collecting member is separated in FIG. 1.
Figure 4:
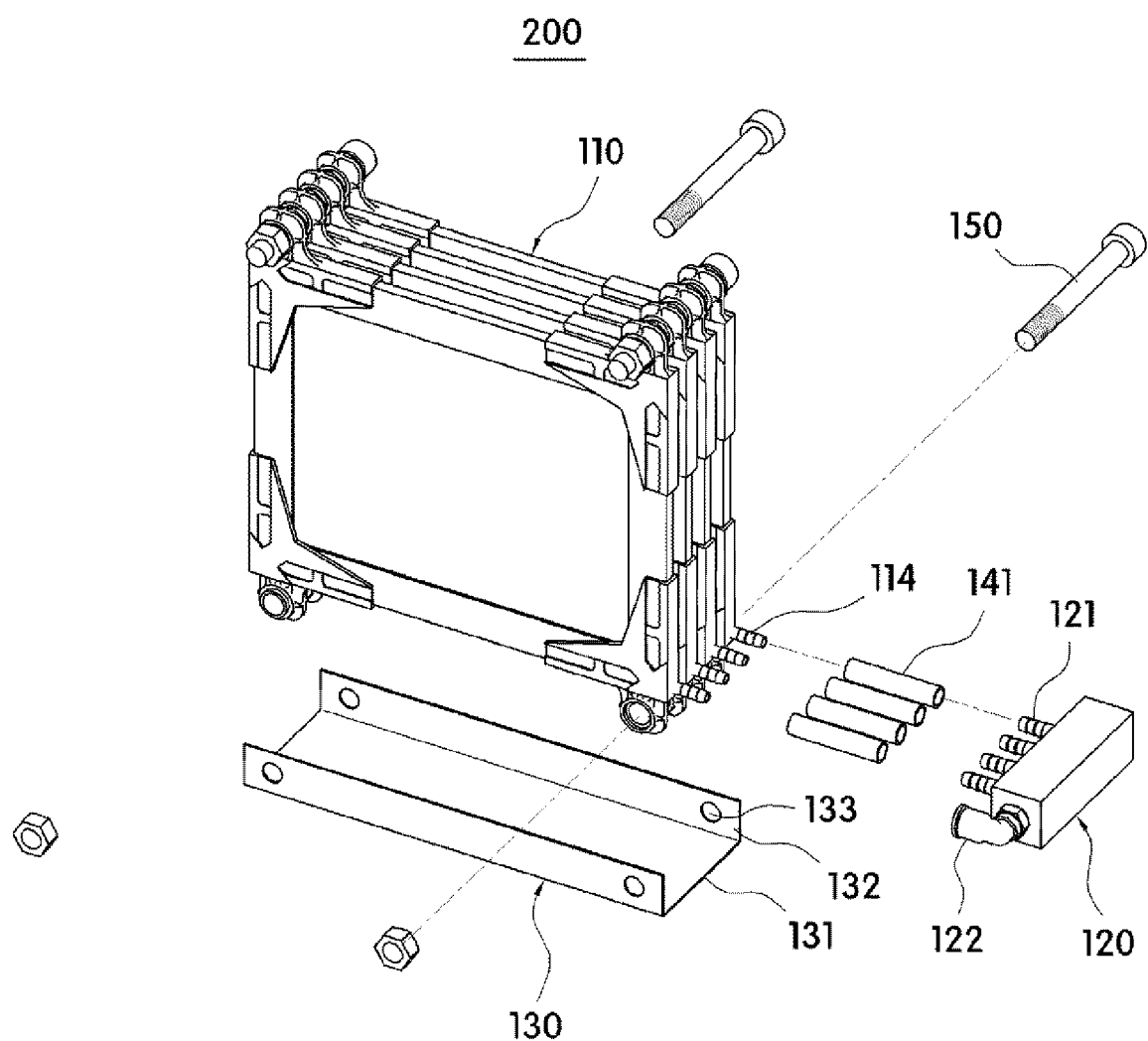
FIG. 4 is a diagram illustrating a state in which a common water collecting member and a weighting member are separated in FIG. 3.

In this case, as shown in FIGS. 2 and 4, the plurality of inlets 121 may be provided to be connected to the water collecting portions 114 provided on the filter members 110, and the plurality of inlets 121 may be connected to be one-to-one matched to the water collecting portions 114. Consequently, the filtered water produced from the filter members 110 may flow into the common water collecting member 120 and then be collected therein.

Meanwhile, as shown in FIGS. 3 to 7 and FIGS. 26 and 27, the filter module 200, 300, 400, 500, or 600 for a gravity-type water purifier according to one embodiment of the present invention may further include a weighting member 130, 130', or 230.

The weighting member 130, 130', or 230 may increase an overall weight of the filter module 200, 300, 400, 500, or 600 such that the filter module 200, 300, 400, 500, or 600 may be easily sunk.

That is, the weight of the filter module 200, 300, 400, 500, or 600 for a gravity-type water purifier according to one embodiment of the present invention may increase due to the weighting member 130, 130', or 230 so that, even though a separate confinement member is not used, the filter module 200, 300, 400, 500, or 600 may be maintained to be in a sunk state or a submerged state on a bottom surface of an inner space S1 filled with the raw water.

In other words, when an amount of the raw water stored in the inner space is large, the filter module 200, 300, 400, 500, or 600 for a gravity-type water purifier may be maintained to be in a state of being completely sunk into the raw water, whereas, even when the amount of the raw water stored in the inner space is small, the filter module 200, 300, 400, 500, or 600 for a gravity-type water purifier allows the amount of the raw water in contact with the filtration members 111 to be maximized such that the production of the filtered water may be smoothly performed.

To this end, the weighting member 130, 130', or 230 may be formed having a frame structure and be disposed below each of the filter members 110. Alternatively, the weighting member 130, 130', or 230 may be made in the form of a mesh net and disposed parallel to the filter members 110. The weighting member 130, 130', or 230 may be fixed to the fastening bar 150 for binding the filter members 110. Further, the weighting member 130, 130', or 230 may be made of a metal material or a stainless steel material.

Figure 3:
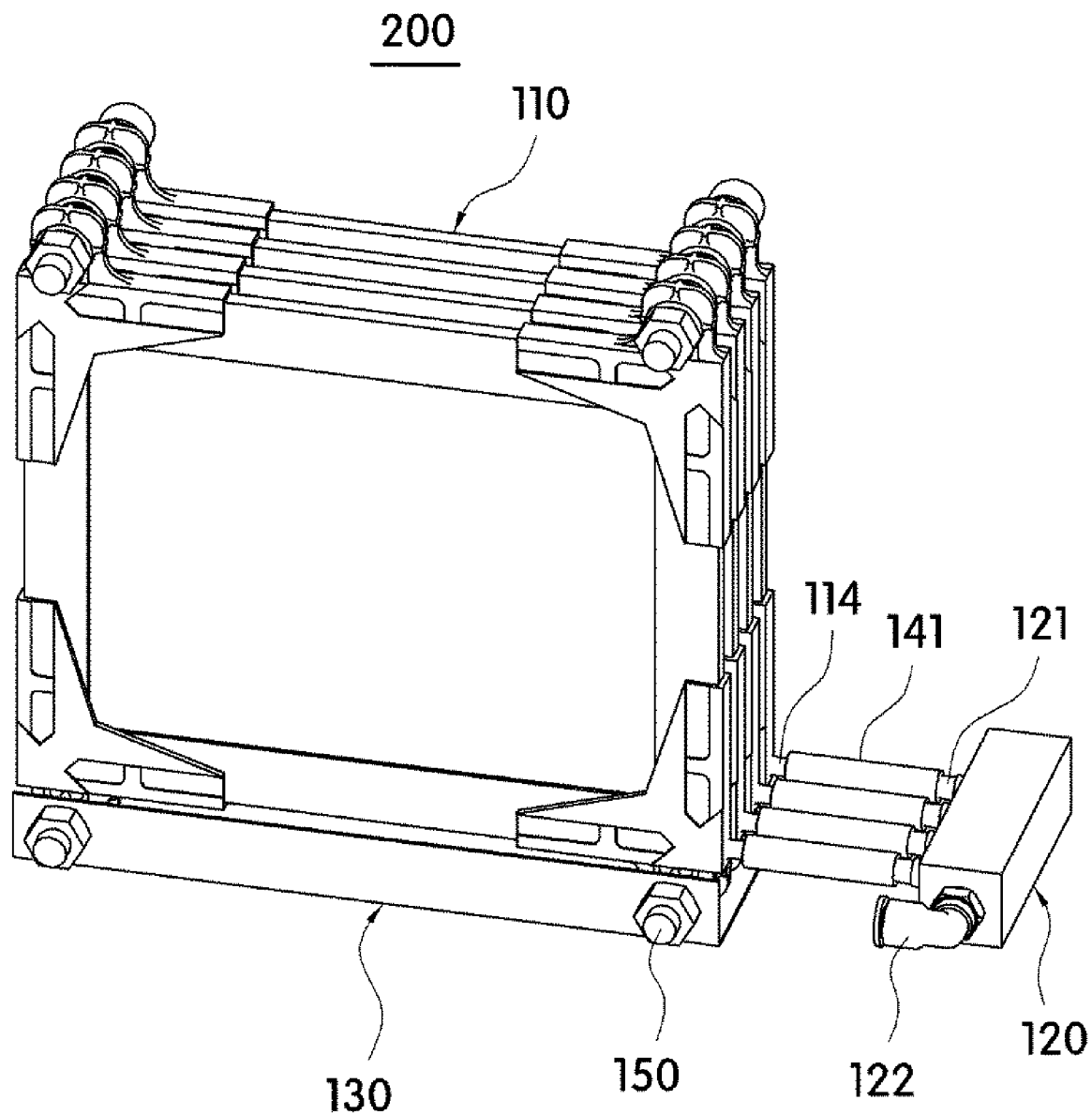
FIG. 3 is a schematic diagram illustrating a filter module for a gravity-type water purifier according to another embodiment of the present invention.
Figure 5:
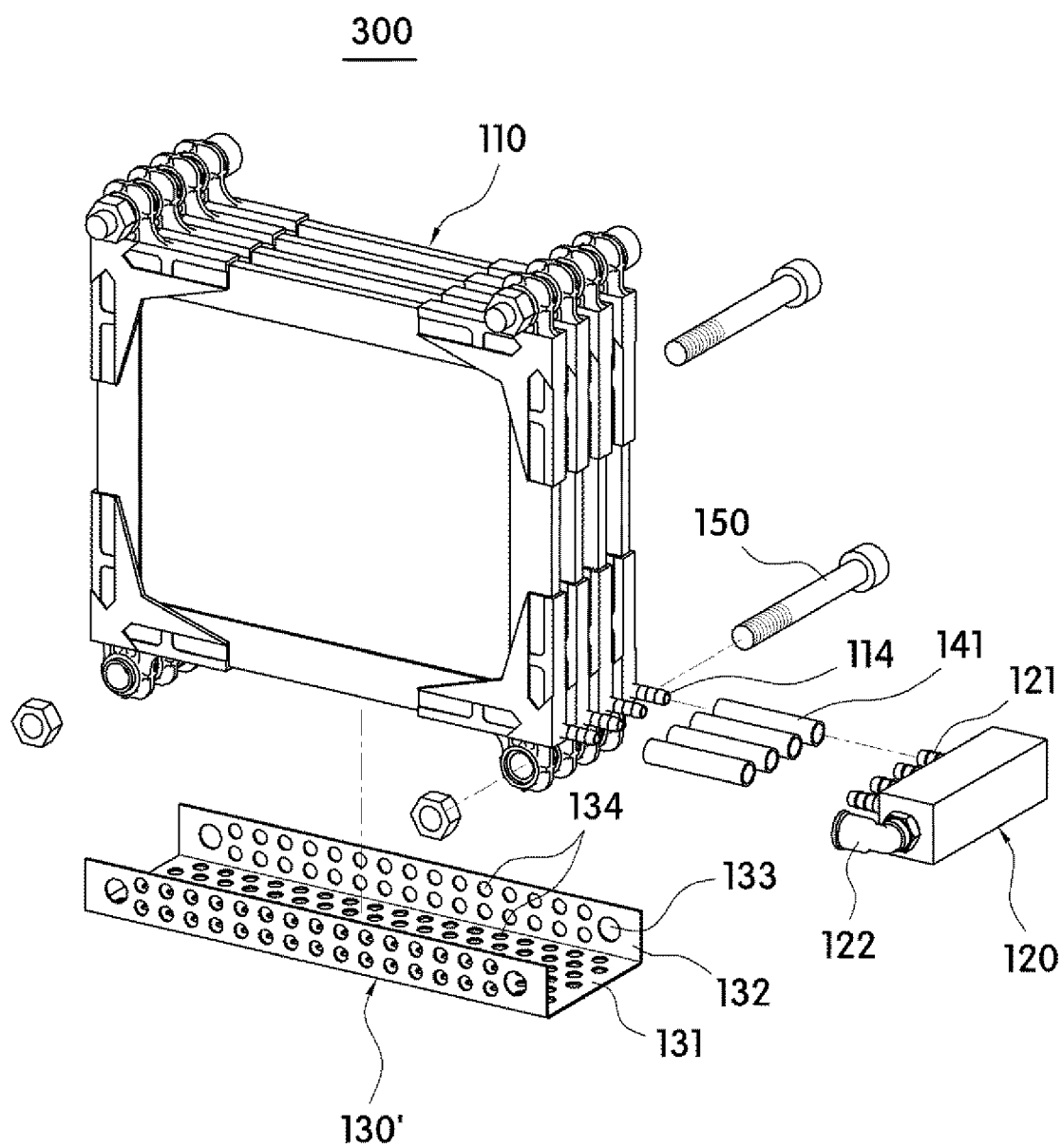
FIG. 5 is a diagram illustrating an alternative form of the weighting member of FIG. 4.

As a specific example, as shown in FIGS. 3 to 5, the weighting member 130 or 130' may include a first plate 131 having a predetermined area and a pair of second plates 132 extending upward from both ends of the first plate 131. The pair of second plates 132 may be coupled to both end portions of the fastening bar 150 via engagement holes 133. However, a shape of the weighting member 130 or 130' is not limited thereto, and the pair of second plates 132 may be provided in the form of a bracket extending from the first plate 131 so as to be coupled to the fastening bar 150.

In this case, as shown in FIG. 5, at least one through-hole 134 may be formed to pass through the weighting member 130'. While the filter module 300 is sunk, the raw water may pass through the through-hole 134 such that generation of buoyancy may be minimized while the overall weight of the filter module 300 increases. Consequently, the filter module 300 may be sunk smoothly. Although the through-hole 134 is illustrated in the form of a through-hole in the drawing, the present invention is not limited thereto, and the through-hole 134 may be formed as an elongated hole shape or a slit shape. Further, an area of the through-holes 134 and the number thereof may be appropriately changed.

Figure 6:
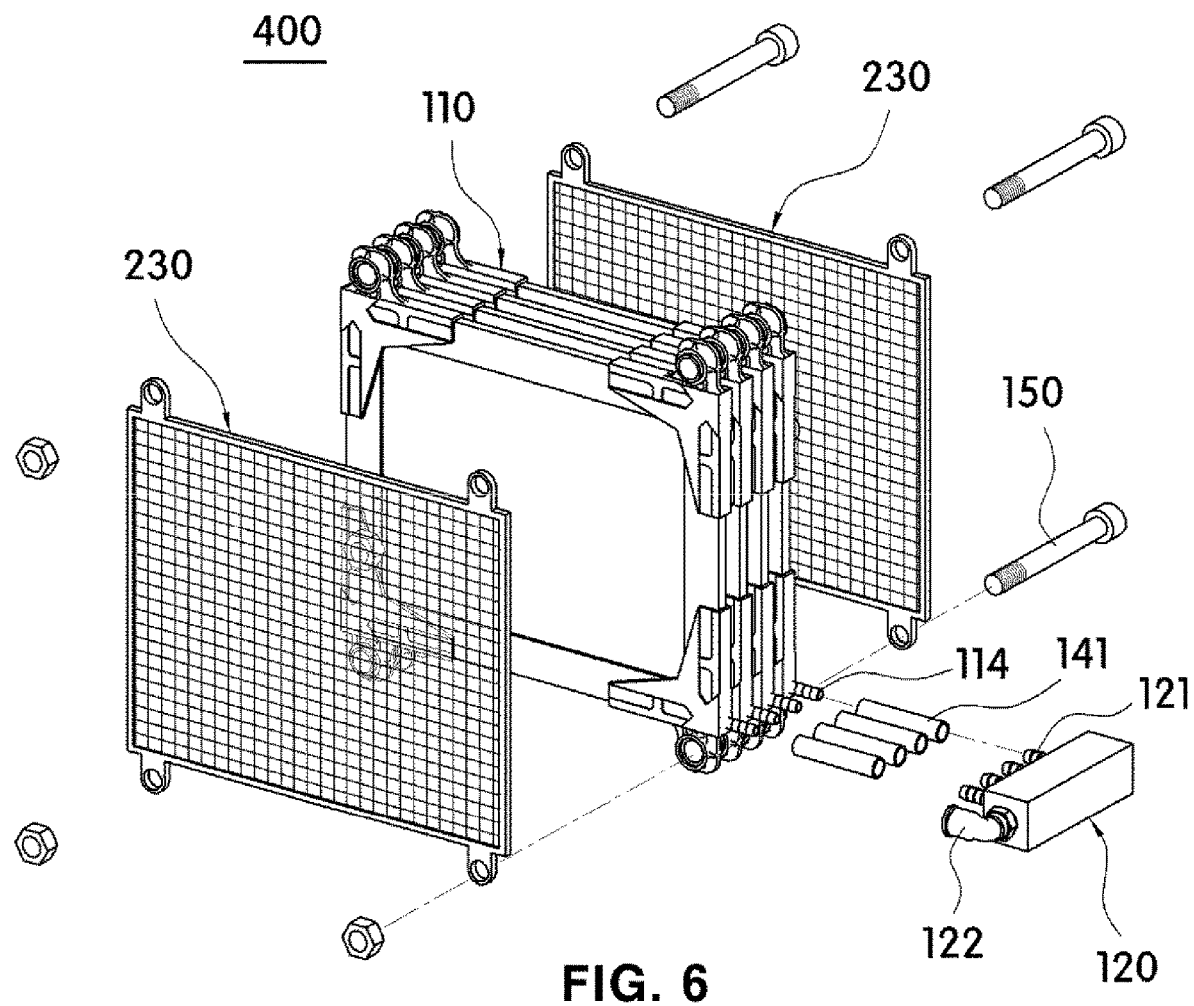
FIG. 6 is a diagram illustrating a state in which a common water collecting member and a weighting member are separated from a filter module for a gravity-type water purifier according to still another embodiment of the present invention.

As another example, as shown in FIG. 6, the weighting member 230 may be in the form of a mesh net in which a plurality of through-holes are formed. Further, the weighting member 230 may be disposed to face one surface of a filter member 110 which is disposed on an outermost side among the filter members 110 disposed in parallel. Preferably, a pair of weighting members 230 may be provided and may each be disposed to face one surface of each of two filter members 110 which are disposed on outermost sides among the filter members 110.

In this case, the weighting members 230 may serve to increase the overall weight of the filter module 400 and serve to filter foreign materials contained in the raw water. Thus, relatively large-sized foreign materials may be filtered when the raw water passes through the through-holes of the weighting member 230, and then the raw water may flow into the filtration members 111 of the filter members 110. Consequently, the filter module 400 according to the present embodiment may reduce an amount of foreign materials attached to surfaces of the filtration members 111 such that the service life of the filtration members 111 may be increased and productivity of the filtered water may also be increased.

Figure 7:
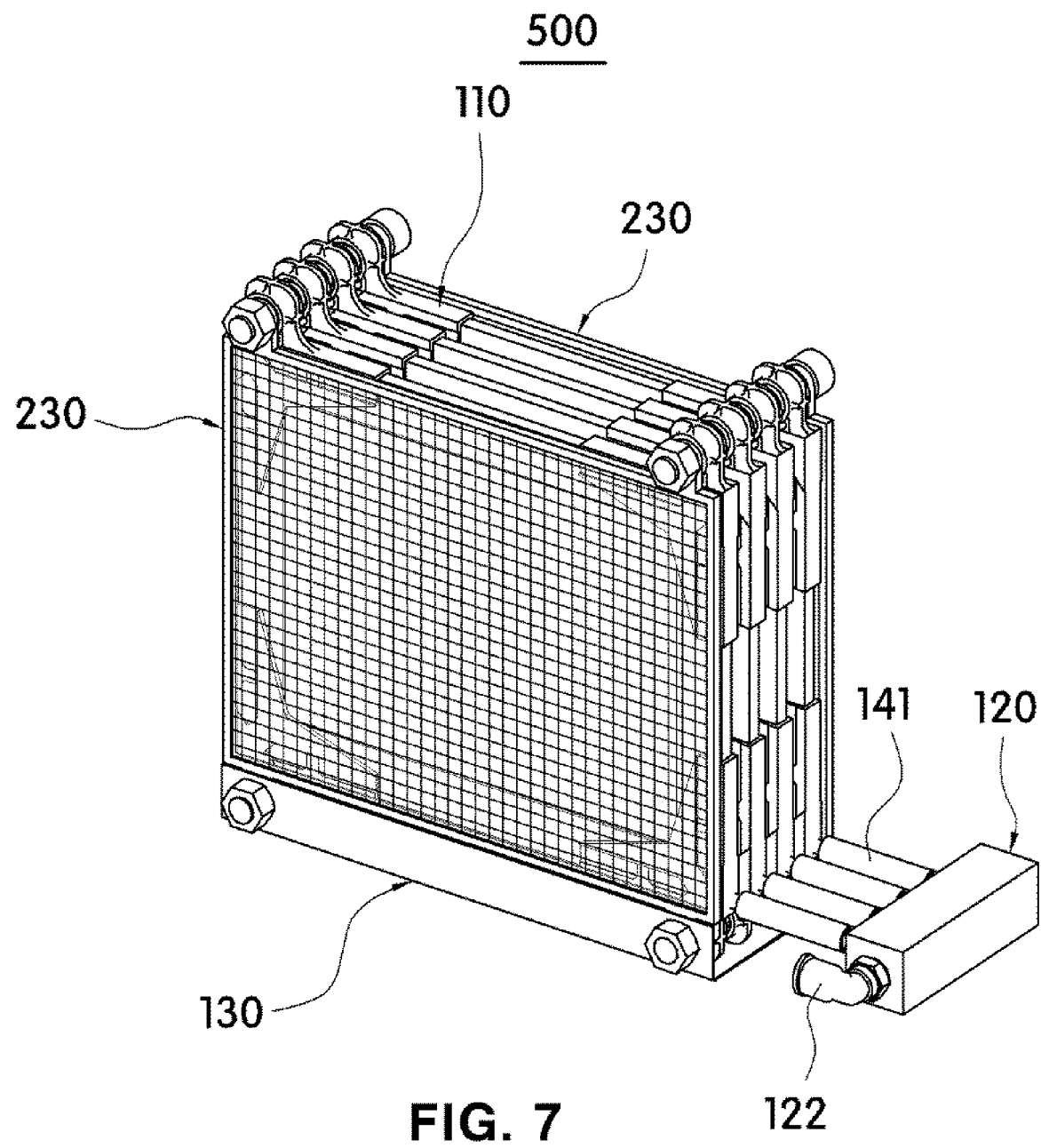
FIG. 7 is a diagram illustrating the filter module for a gravity-type water purifier according to still another embodiment of the present invention that illustrates a form in which the weighting member applied to FIGS. 3 and 6 is assembled.
Figure 8:
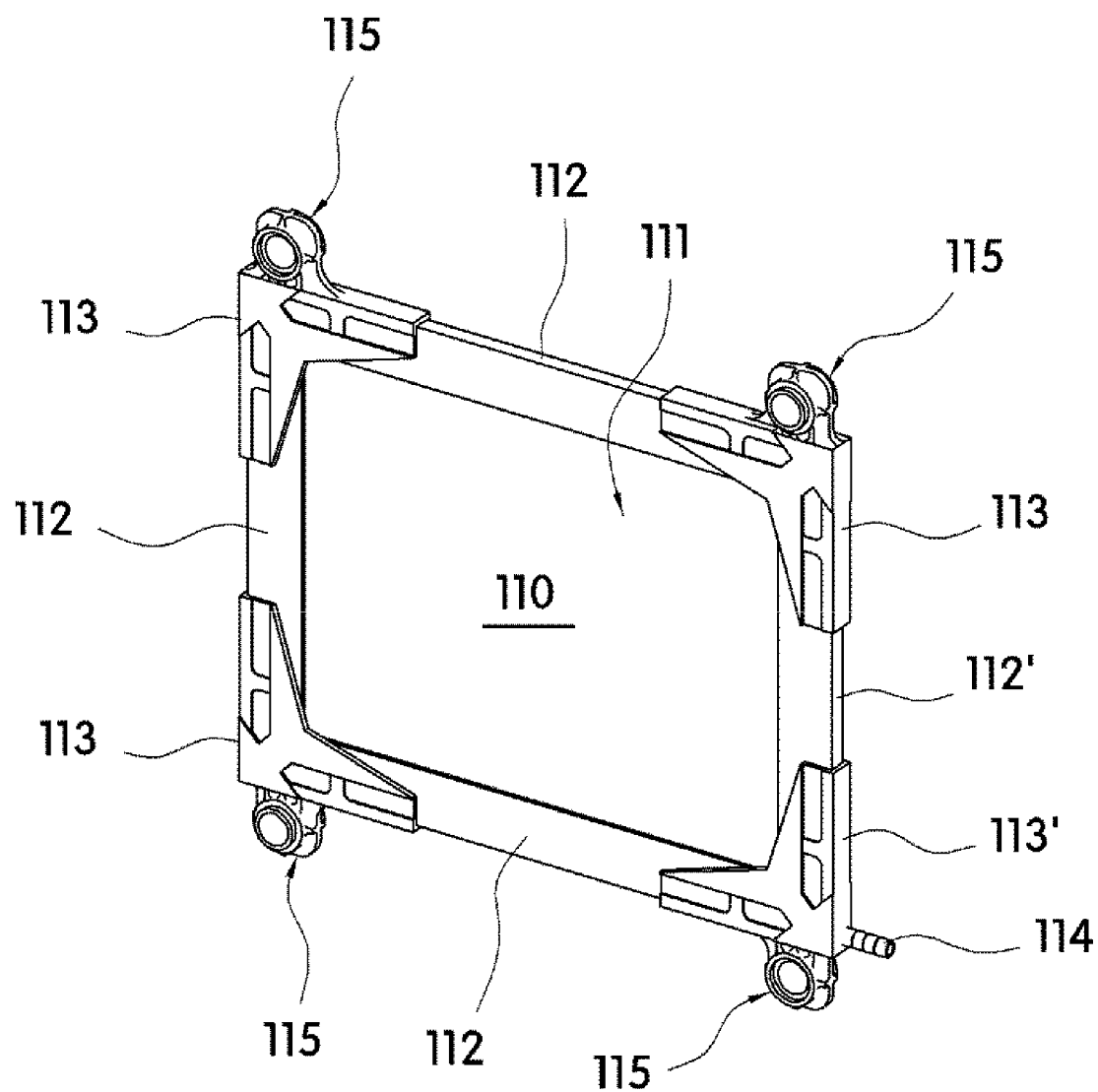
FIG. 8 is a diagram illustrating one form of a filter member applicable to the filter module for a gravity-type water purifier according to the present invention.
Figure 9:
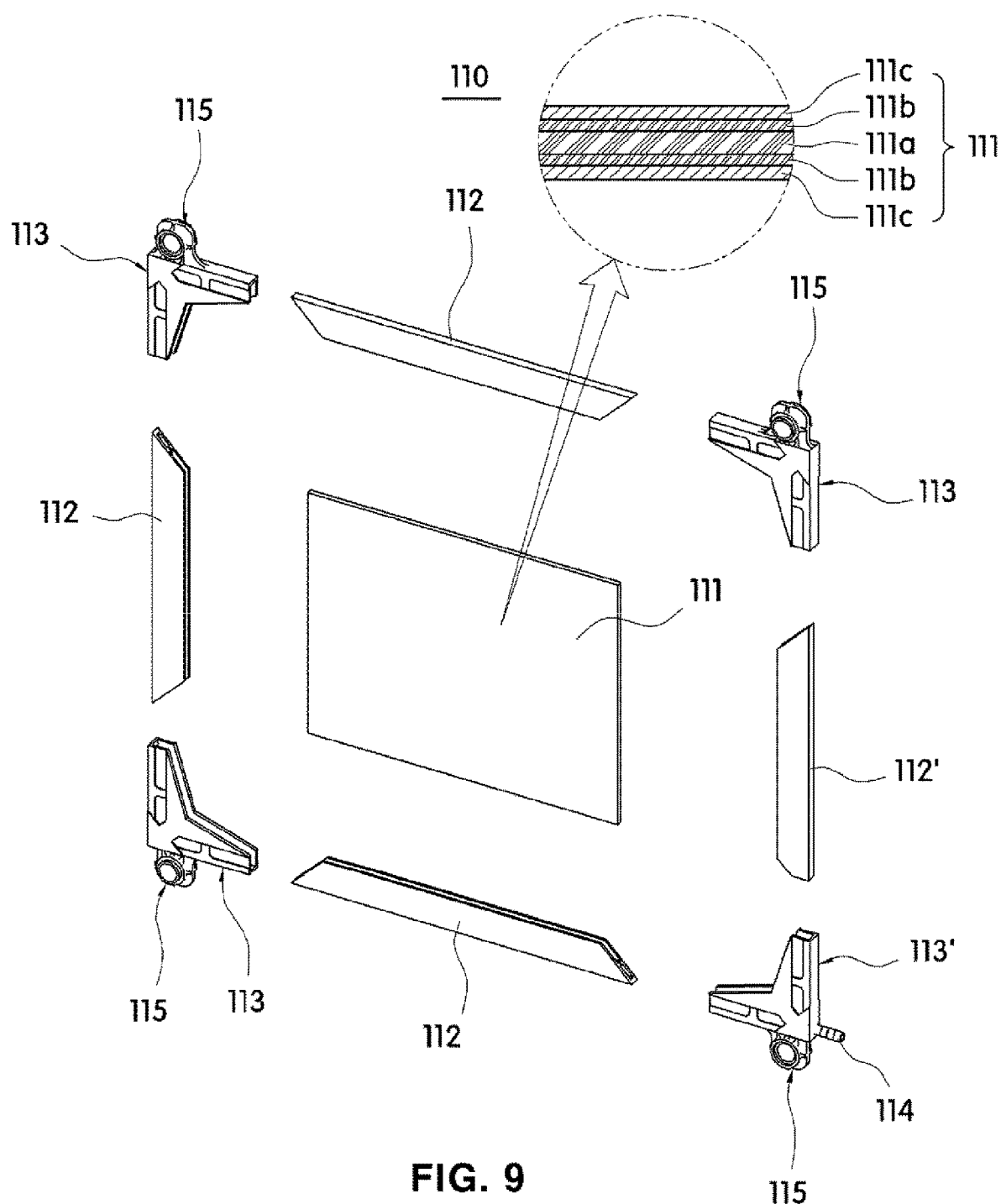
FIG. 9 is an exploded view of FIG. 8.

As still another example, as shown in FIG. 7, the filter module 500 for a gravity-type water purifier according to one embodiment of the present invention may include both of the weighting member 130 or 130' composed of the frame structure of FIGS. 4 and 5 and the weighting member 230 composed of the mesh net of FIG. 6.

Meanwhile, each of the filter members 110 applied to the present invention may be made in a plate form having a predetermined area. For example, as shown in FIGS. 8 to 13, the filter member 110 may include the filtration member 111, a support frame, and connecting members 113 and 113'.

The filtration member 111 may filter foreign materials from the raw water containing the foreign materials. The filtration member 111 may be a known filtration member which is commonly used in water treatment, and the filtration member 111 may have a plate shape in which a nanofiber web 111c is disposed on at least one surface of a first support 111a.

According to the present invention, the nanofiber web 111c may filter foreign materials contained in the raw water while the raw water passes through the nanofiber web 111c, and the first support 111a may serve to support the nanofiber web 111c and serve as a flow path through which filtered water produced from the nanofiber web 111c flows.

In this case, the filtration member 111 may be formed of a three-layer structure in which the nanofiber web 111c is directly attached to both surfaces of the first support 111a, and alternatively, a five-layer structure in which a second support 111b is interposed between the nanofiber web 111c and the first support 111a.

Here, the second support 111b may be formed to have a thickness that is relatively smaller than a thickness of the first support 111a so as to reduce the overall thickness of the filtration member 111. The second support 111b may be laminated on one surface of the first support 111a.

Accordingly, the nanofiber web 111c may be attached through the second support 111b without being directly attached to the first support 111a, thereby improving adhesion and being easily attached to the first support 111a.

As a specific example, the nanofiber web 111c may be attached to the first support 111a via the second support 111b through heat fusing, ultrasonic fusing, microwave fusing, or the like.

In this case, during the attachment, the second support 111b may be partially or entirely melted and then the second support 111b may be attached to the first support 111a. To this end, the nanofiber web 111c may be formed of a material have a melting temperature that is higher than a process temperature during the fusing so as to not be melt due to heat, and the second support 111b may be formed of a material have a melting temperature that is lower than the process temperature during the fusing.

Accordingly, the filtration member 111 may be implemented as a three-layer structure due to complete melting of the second support 111b, and alternatively, as a five-layer structure in which the second support 111b is partially melted to remain between the nanofiber web 111c and the first support 111a. However, a structure of the filtration member 111 is not limited to the above-described structures, and it is noted that any structure may be employed as long as it can be constituted such that one or more supports are interposed between two nanofiber webs 111c.

Further, the first support 111a and the second support 111b may each be made of a porous base material so as to serve as a flow path through which the filtered water produced from the nanofiber web 111c flows. For example, the first support 111a and/or the second support 111b may be any one among a fabric, knitted material, and a non-woven fabric which are commonly used. The non-woven fabric may include a dry non-woven fabric or a wet nonwoven fabric such as a chemical bonding non-woven fabric, a thermal bonding non-woven fabric, an airlay non-woven fabric, or the like, or a known non-woven fabric such as a spunless non-woven fabric, a needle punching non-woven fabric, or a meltblown non-woven fabric. A pore diameter, porosity, a basis weight, and the like of the nonwoven fabric may be appropriately varied according to desired water permeability, desired filtration efficiency, and mechanical strength.

In other words, a material of the first support 111a and/or the second support 111b is not limited. As a non-limiting example, a synthetic fiber selected from the group consisting of polyester, polypropylene, nylon, and polyethylene, or a natural fiber including a cellulose-based fiber may be used. However, the first support 111a and/or the second support 111b may be made of a material capable of improving a binding force with the nanofiber web 111c to prevent separation therefrom and preventing a problem such as degradation of water permeability due to the use of a separate adhesive component. As a non-limiting example, the first support 111a and the second support 111b may each include a low-melting-point polymer such as a known low-melting-point polyester, a known low-melting-point polyethylene, or the like which is capable of being thermally fused. The first support 111a and the second support 111b may each be a polyester-based low-melting-point composite fiber having low-melting-point polyester as a sheath and polyethylene terephthalate as a core and/or a polyolefin-based low-melting-point composite fiber having low-melting-point polyethylene as a sheath and polypropylene as a core. Here, a melting point of the low-melting-point polymer may be in the range of 60° C. to 180° C. and a thickness of the first support 111a may be in the range of 2 µm to 400 µm, but the present invention is not limited thereto.

Meanwhile, the second support 111b applied to the present invention may be made of a material that is different from that of the first support 111a. Alternatively, the second support 111b may be made of a material that is the same as that of the first support 111a to enhance adhesive power with the first support 111a while being laminated therewith.

The nanofiber web 111c is configured to filter foreign materials contained in a target filtration liquid and may be formed of a nanofiber. In this case, the nanofiber may include a fiber forming component containing polyacrylonitrile (PAN) and polyvinylidene fluoride (PVDF) and include an emulsifier for improving miscibility of the fiber forming component. Here, the fiber forming component may include PAN having high hydrophilicity and PVDF having very high hydrophobicity.

The PVDF may secure mechanical strength and chemical resistance of the nanofiber due to the nature of a material. Further, since the PAN has high hydrophilicity, hydrophobicity of the nanofiber due to the PVDF is prevented and hydrophilicity thereof is improved such that, when the nanofiber is attached to the filtration member, improved water permeability may be exhibited.

Meanwhile, the nanofiber web 111c may be a nanofiber web of a three-dimensional network structure. For example, the nanofiber including the emulsifier and including the fiber forming component containing the PAN and the PVDF is stacked perpendicular to a stranding surface. Owing to a solvent which is not volatilized and evaporated into air during stranding, fusing occurs in a portion at which surfaces of nanofibers among the stacked nanofibers are brought into contact with each other such that a three-dimensional network structure may be formed.

Figure 14:
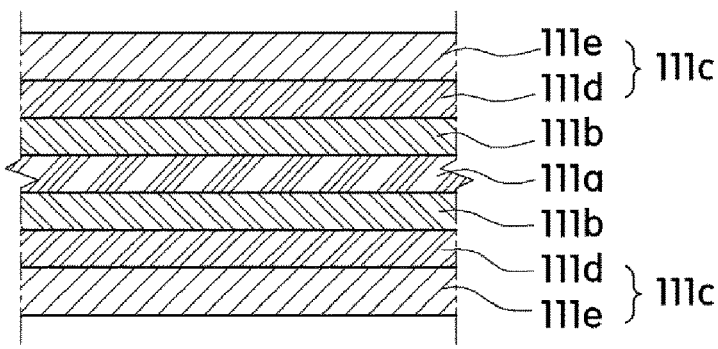
FIG. 14 is a cross-sectional view illustrating an alternative form of the filtration member applicable to FIG. 8.
Figure 15:
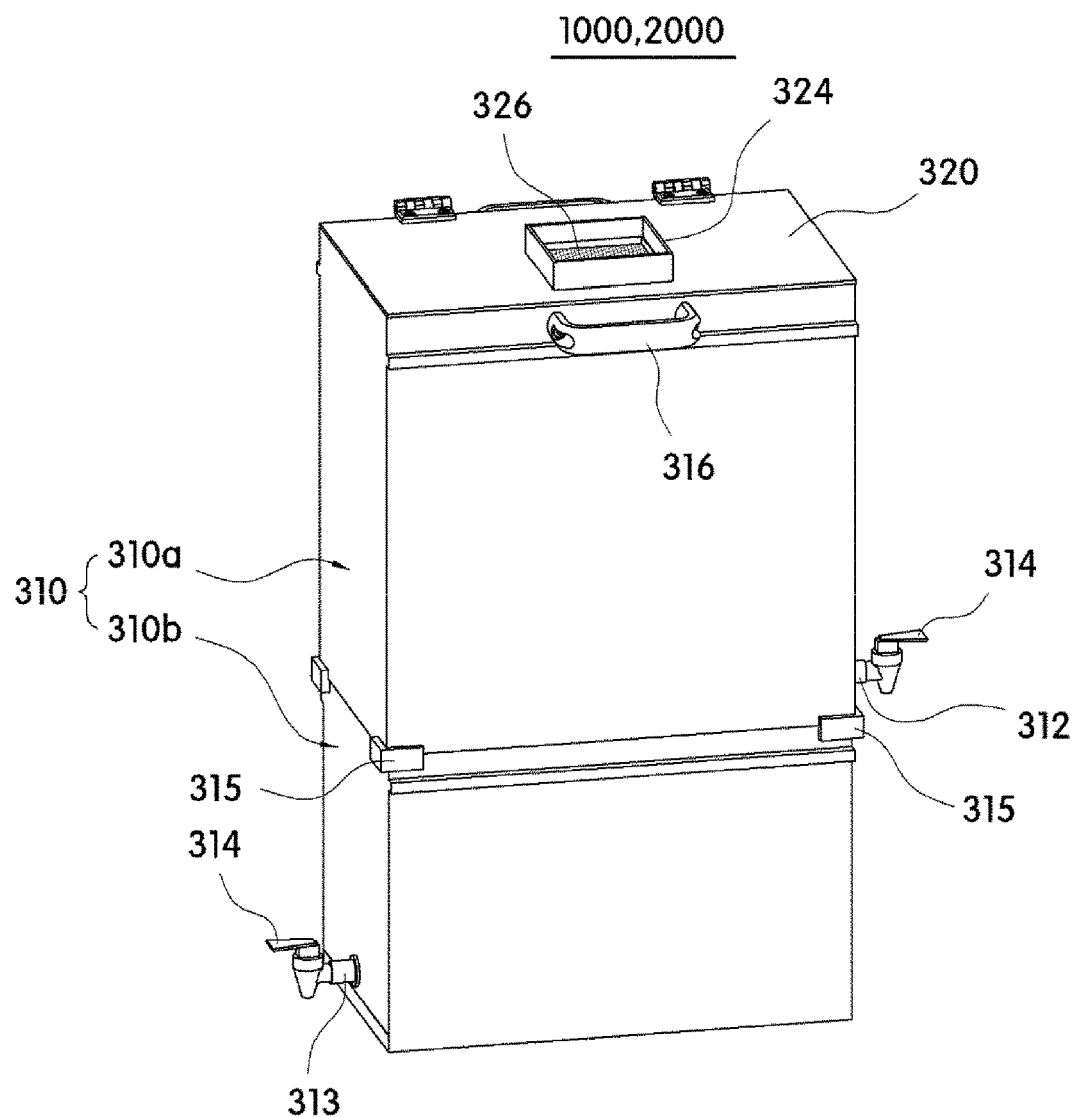
FIG. 15 is a schematic diagram illustrating a gravity-type water purifier to which the filter module for a gravity-type water purifier according to one embodiment of the present invention is applied.

The nanofiber web 111c may be constituted of a single layer or a multilayer. For example, as shown in FIG. 14, the nanofiber web 111c may be constituted of a first nanofiber web 111d attached to one surface of the first support 111a or the second support 111b and a second nanofiber web 111e stacked on one surface of the first nanofiber web 111d. In this case, one surface of the first nanofiber web 111d may be coated with an antimicrobial material such as a silver nanomaterial.

Accordingly, while the raw water sequentially passes through the second nanofiber web 111e and the first nanofiber web 111d, foreign materials may be filtered, and simultaneously, harmful components such as bacteria are filtered again through the antibacterial material contained in the first nanofiber web 111d such that high quality filtered water may be produced.

Further, the second nanofiber web 111e not containing the antimicrobial material may be stacked on one surface of the first nanofiber web 111d to be brought into direct contact with the raw water such that microorganisms may grow on a surface of the second nanofiber web 111e. Consequently, the microorganisms may remove organic matter attached to the surface of the second nanofiber web 111e such that fouling due to the organic matter may also be prevented.

In the present embodiment, the silver nanomaterial is described as an example of the antibacterial material, but the present invention is not limited thereto, and various known materials which are known as antibacterial materials may be used as long as they can be attached to or coated on the nanofiber web 111c.

The support frame is disposed on an edge of the filtration member 111 to support the edge thereof such that the filtration member 111 may be maintained in a plate form.

The support frame may be made of a single member to entirely or partially support the edge of the filtration member 111. Alternatively, the support frame may be implemented in a form in which a plurality of frames 112 and 112' are coupled to the edge of the filtration member 111.

For example, the plurality of frames 112 and 112' may each be disposed on the edge of the filtration member 111 so as to allow an end portion of one frame among the plurality of frames 112 and 112' to be brought into contact with an end portion of another frame thereamong, and end portions of two adjacent frames 112 and 112 or 112 and 112' may be connected via the connecting members 113 and 113' which are disposed at corners of the filtration member 111. However, the support frame is not limited to the above-described shape and may have any one shape among a circular shape, an arc shape, a polygonal shape, and a combination thereof according to the shape of the filtration member 111. Any shape may be employed as long as it can entirely surround the edge of filtration member.

Figure 10:
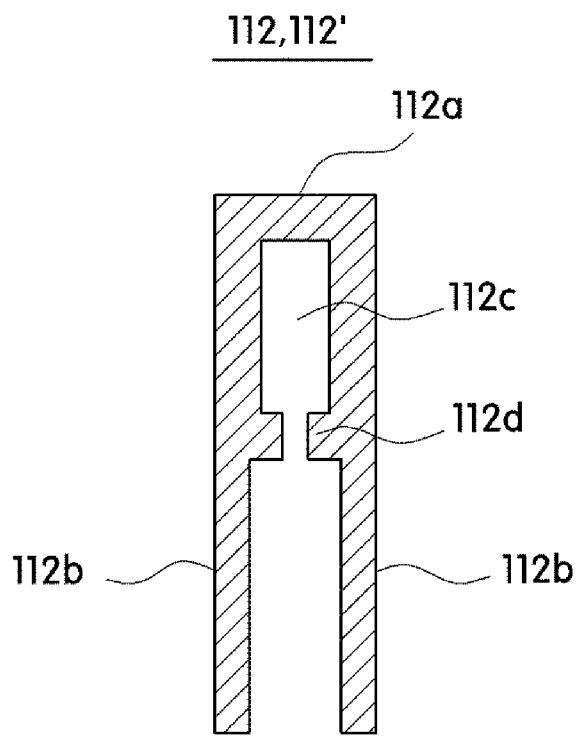
FIG. 10 is a cross-sectional view of a frame applied to FIG. 8.
Figure 11:
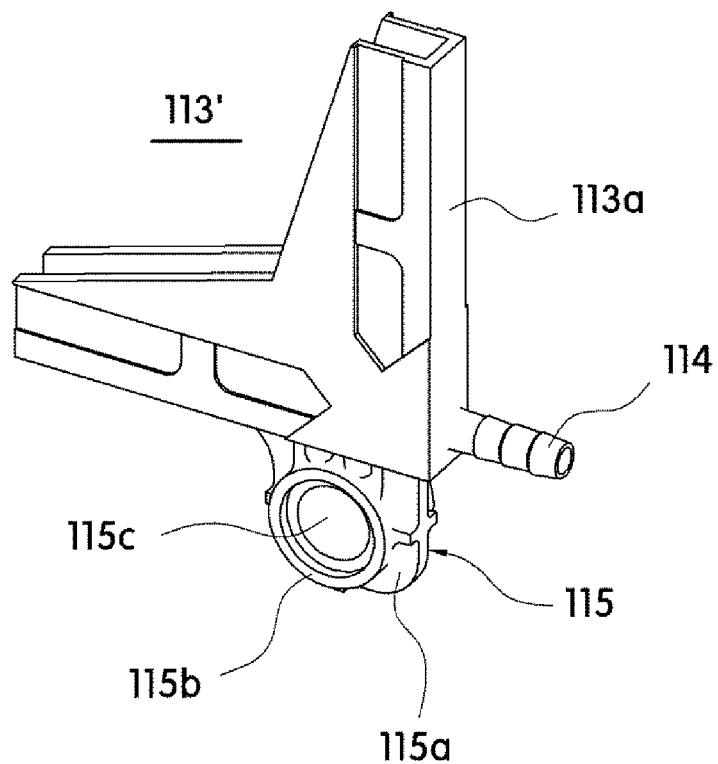
FIG. 11 is a diagram illustrating a connecting member applied to FIG. 8.

In this case, the support frame may serve to support the filtration member 111 and serve as a flow path through which the filtered water produced by the filtration member 111 flows to the water collecting portion 114. To this end, each of the frames 112 and 112' constituting the support frame may be provided as a substantially angled "C" shape with one open side. Accordingly, as shown in FIG. 10, a flow path 112c, through which the filtered water introducing from the filtration member 111 flows, may be formed in each of the frames 112 and 112'.

Specifically, the plurality of frames 112 and 112' may each include a plate-shaped first plate 112a and a pair of second plates 112b extending from both end portions of the first plate 112a to be disposed to face each other. The flow path 112c may be formed between the pair of second plates 112b facing each other in a length direction of each of the plurality of frames 112 and 112'.

Consequently, the edge of the filtration member 111 may be inserted into a space formed between the pair of second plates 112b, thereby being supported by the pair of second plates 112b facing each other. In this case, the edge of the filtration member 111 inserted into the space formed between the pair of second plates 112b may be inserted to be spaced a predetermined distance from the first plate 112a. That is, confinement members 112d for limiting an insertion depth of the filtration member 111 may be provided on facing surfaces of the pair of second plate 112b facing each other. Consequently, the insertion depth of the filtration member 111 may be limited by the confinement members 112d while the edge of the filtration member 111 is engaged with the frames 112 and 112' such that the flow path 112c through which the filtered water may flow may be formed between an end portion of the edge of the filtration member 111 and the first plate 112a.

In the present invention, the confinement members 112d may be formed on the facing surfaces of the pair of second plates 112b facing each other. Alternatively, the confinement member 112d may be formed only on an inner surface of any one of the pair of second plates 112b. Further, the confinement members 112d may be entirely or partially provided in the length direction of each of the frames 112 and 112'. Furthermore, in a case in which the confinement members 112d are formed on the facing surfaces of the pair of second plates 112b to be facing each other, the confinement members 112d are disposed to be spaced a predetermined gap apart from each other such that the filtered water may flow to the flow path 112c through the predetermined gap.

Meanwhile, the filter member 110 applied to the present invention may include the connecting members 113 and 113' coupled to the corners of the support frame. A plurality of connecting members 113 and 113' may be provided and be coupled to the corners of the support frame, thereby fixing end portions of two adjacent frames 112 and 112 or 112 and 112'.

To this end, the connecting members 113 and 113' may each include a body 113a having one open side so as to allow the end portions of the two adjacent frames 112 and 112 or 112 and 112' to be inserted. Accordingly, end portions of two adjacent frames among the plurality of frames 112 and 112' constituting the support frame may each be inserted into the body 113a to be fixed thereby.

Figure 12:
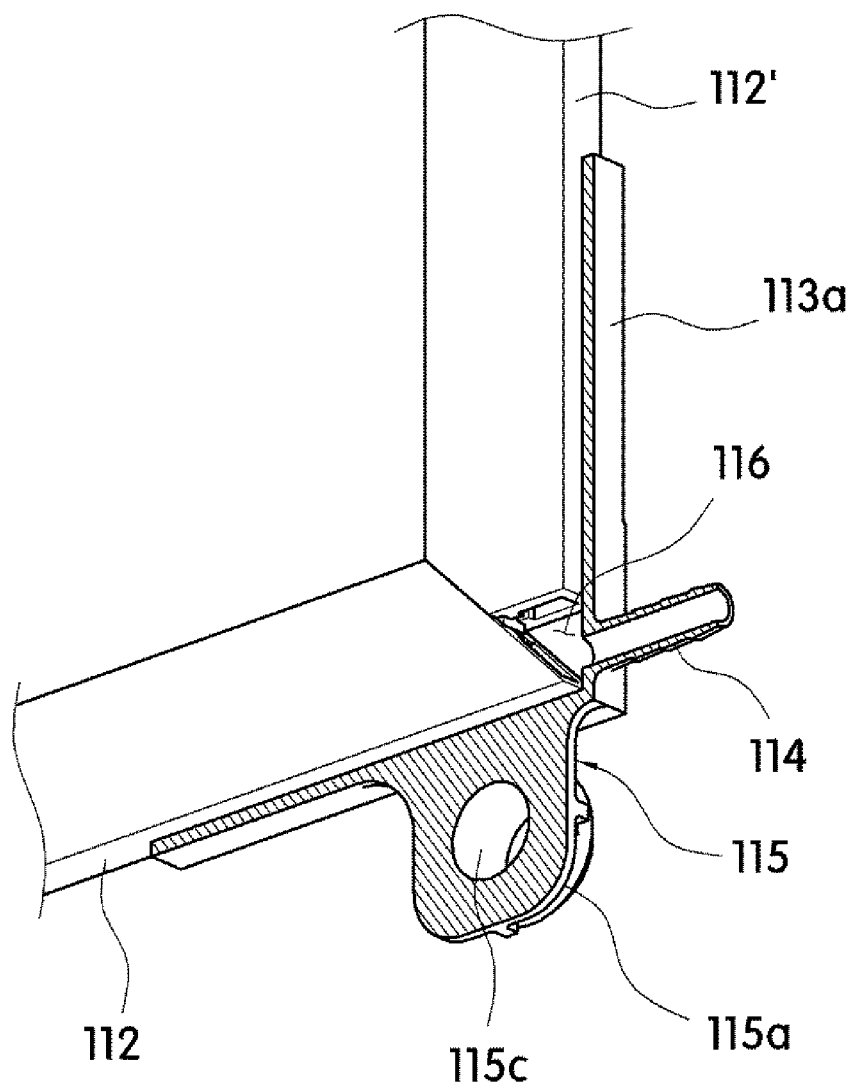
FIG. 12 is a diagram illustrating a coupling relationship between the connecting member and a support frame in FIG. 8.
Figure 13:
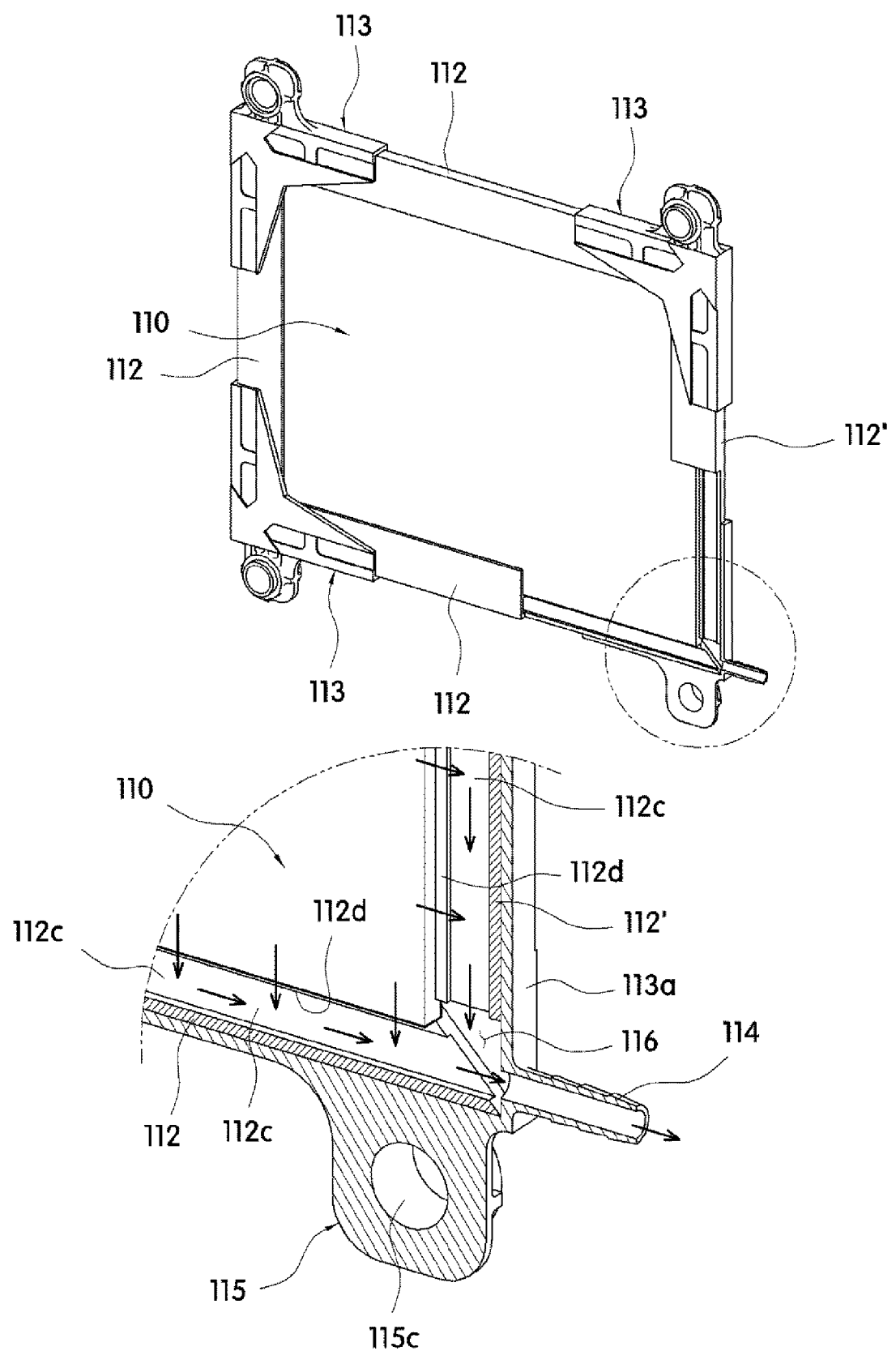
FIG. 13 is a diagram illustrating a flow path in which filtered water flows into a water collecting portion in FIG. 8.

For example, an end portion of the frame 112 of the two adjacent frames 112 and 112' is inserted in a first direction of the body 113a, and an end portion of the frame 112' thereof is inserted in a second direction of the body 113a such that the end portion of the frame 112' may be disposed to be brought into contact with the end portion of the frame 112 inserted in the first direction (See FIG. 12).

In this case, a flow path 112c formed in a frame 112 inserted in the first direction and a flow path 112c formed in a frame 112' inserted in the second direction may be disposed to communicate with each other such that all flow paths formed in the plurality of frames 112 and 112' may communicate with each other.

Here, the first direction and the second direction may be coplanar directions perpendicular to each other or may be coplanar inclined directions having a predetermined angle with respect to one straight line.

Meanwhile, the filter members 110 applied to the present invention may each include gap adjusters 115. Thus, in a case in which the filter members 110 are disposed in parallel at predetermined intervals, each of the filtration members 111 included in the filter members 110 may be disposed to be spaced a predetermined gap apart from each other through the gap adjusters 115. The gap adjusters 115 may be provided on at least one among the plurality of frames 112 and 112' constituting the support frame. Alternatively, the gap adjusters 115 may be provided on at least one among the connecting members 113 and 113'.

For example, the gap adjusters 115 may each include an extension plate 115a having an engagement hole 115c, and a spacing member 115b and may be formed on one side of each of the connecting members 113 and 113'.

Specifically, the extension plate 115a may extend outward from the body 113a of each of the connecting members 113 and 113', and the engagement hole 115c through which the fastening bar 150 passes may be formed to pass through the extension plate 115a. Here, although the engagement hole 115c has been illustrated in the drawing as being formed to pass through the extension plate 115a in a circular shape, the present invention is not limited thereto, and the engagement hole 115c may have a shape corresponding to a cross-sectional shape of the fastening bar 150. For example, the engagement hole 115c may have any one among a circular shape, an arc shape, a polygonal cross-section, and a combination thereof, and the fastening bar 150 may also have any one among a circular shape, an arc shape, a polygonal cross-section, and a combination thereof.

In this case, the spacing member 115b may protrude to a predetermined height from one surface of the extension plate 115a so as to have a predetermined thickness. The spacing member 115b may be provided to entirely or partially surround an edge of the engagement hole 115c.

Here, the spacing member 115b may be formed on both surfaces of the extension plate 115a or on only one surface thereof. The spacing member 115b may be formed as a multi-stage structure having heights which are different from one surface of the extension plate 115a.

Consequently, in the filter module 100, 200, 300, 400, 500, or 600 for a gravity-type water purifier according to the present invention, in a case in which the filter members 110 are connected through the fastening bar 150, even though the filter members 110 are completely pressed against each other, the filtration members 111 disposed in parallel may be spaced a gap apart from each other through the spacing member 115b (see FIG. 3). Thus, when the filter members 110 are pressed against each other in a state of being engaged with the fastening bar 150, the filtration members 111 disposed adjacent to each other may be spaced a predetermined gap apart from each other by the spacing member 115b.

That is, when the filter members 110 connected to the fastening bar 150 are pressed against each other, even though an operator does not manually adjust a gap between the filter members 110, a uniform gap may be formed between the filtration members 111 by the spacing member 115b. When fixing members such as nuts are engaged with both sides of the fastening bar 150, the gap formed between the filtration members 111 may be maintained.

Consequently, since raw water may be present on both sides of each of the filtration members 111 in the filter member 110, the raw water may flow from both external sides of each of the filtration members 111 toward an interior of each thereof due to gravity or water pressure such that filtered water may be produced.

Further, when a back-washing process is performed to remove foreign materials adhering to each of the plurality of filtration members 111 after the production process of the filtered water is repeatedly performed, the foreign materials adhering to each of the plurality of filtration members 111 may be separated therefrom due to a pressure of a fluid such as washing water supplied from the outside and then may fall into a space between adjacent filtration members 111.

Meanwhile, the water collecting portion 114 which discharges the filtered water flowing along the flow paths 112c formed in the frames 112 and 112' may be provided with at least one connecting member 113' among the connecting members 113 and 113'. That is, the connecting member 113 in which the water collecting portion 114 is not formed among the connecting members 113 and 113' coupled to the corners of the support frame may only serve to connect a pair of adjacent frames, whereas the connecting member 113' in which the water collecting portion 114 is formed may also serve as an outlet which discharges the filtered water produced through the water collecting portion 114 to the outside in addition to serving to connect the pair of adjacent frames.

As described above, the water collecting portion 114 may be connected to the common water collecting member 120 via the connecting tube 141.

In this case, a collecting space 116 may be formed in the connecting member 113' having the water collecting portion 114 to communicate with the flow paths 112c formed in the two adjacent frames 112 and 112' when the two adjacent frames 112 and 112' are coupled to the connecting member 113'. The collecting space 116 may be formed at a position communicating with the water collecting portion 114.

For example, the collecting space 116 may be formed on each of the end portions of the two frames 112 and 112' which are inserted into the connecting member 113' having the water collecting portion 114 when coupled to the connecting member 113'. Further, the collecting space 116 may be formed by incising one end portion of the frame 112' of the two frames 112 and 112' inserted into the connecting members 113 and 113' so that the two frames 112 and 112' do not combine shapes with each other.

Meanwhile, the filter module 100, 200, 300, 400, 500, or 600 for a gravity-type water purifier may be applied to the gravity-type water purifier 1000, 2000, or 3000 in which the filtered water is discharged after the raw water flows into the filter member 110 using gravity.

That is, as shown in FIGS. 15 to 22 and FIG. 25, the gravity-type water purifier 1000, 2000, or 3000 according to the present invention may include housings 310 or 410 and the filter module 100, 200, 300, 400, 500, or 600.

The housings 310 and 410 may each be formed as an enclosure shape having a predetermined inner space in which the raw water which is a target treatment liquid may be stored and the filter module 200 for producing filtered water from the raw water may be disposed.

In this case, each of the housings 310 and 410 may include a single space S or two partitioned spaces S1 and S2.

For example, as shown in FIGS. 15 to 22, the housing 310 may include a first housing 310a having a first space S1 in which the raw water is stored, and a second housing 310b having a second space S2 in which the filtered water is stored.

Here, the filter module 100, 200, 300, 400, or 500 for removing foreign materials contained in the raw water may be disposed in the first space S1. At least one outlet 311 connected to the filter module 100, 200, 300, 400, or 500 may be formed on a bottom surface of the first housing 310a to pass through the bottom surface such that an inflow of the raw water from which the foreign materials are not removed may be blocked and only the filtered water produced through the filter module 100, 200, 300, 400, or 500 may flow to the second space S2 of the second housing 310b through the outlet 311. Further, at least one handgrip 316 may be formed on one side of the first housing 310a so as to allow a user to easily grip the first housing 310a.

Further, as described above, the filter module 100, 200, 300, 400, 500, or 600 may be configured in a module in which the plurality of filter members 110 are fixed via the fastening bar 150. The filter module 100, 200, 300, 400, or 500 may be disposed in proximity to the bottom surface of the first housing 310a or be disposed to be brought into contact with the bottom surface thereof in the first space S1.

Accordingly, when the raw water around the filter members 110 permeates into the filtration members 111 due to gravity or water pressure, the filter module 100, 200, 300, 400, or 500 may produce the filtered water from the raw water.

In this case, when the filter module 100, 200, 300, 400, or 500 is disposed in a space in which the raw water is stored, the filter module 100, 200, 300, 400, or 500 may be disposed in proximity to the bottom surface of the first housing 310a or the housing 410 or be disposed to be brought into contact with the bottom surface thereof due to a weight of the filter module 100, 200, 300, 400, or 500. Alternatively, the filter module 100, 200, 300, 400, or 500 may be disposed in proximity to the bottom surface of the first housing 310a or the housing 410 or be disposed to be brought into contact with the bottom surface thereof due to a binding force provided through another member.

For example, as described above, when the filter modules 200, 300, 400, 500, or 600 applied to the gravity-type water purifier 2000 or 3000 according to one embodiment of the present invention includes the weighting member 130, 130', or 230, the weight of the filter module 200, 300, 400, 500, or 600 may increase due to the weighting member 130, 130', or 230 such that the filter module 200, 300, 400, 500, or 600 may be easily sunk into the raw water. That is, the weight of the filter module 200, 300, 400, 500, or 600 may increase due to the weighting member 130, 130', or 230 so that, even though a separate confinement member is not used, the filter module 200, 300, 400, 500, or 600 may be maintained to be in a sunk state or a submerged state on a bottom surface of the first space S1 or the inner space S which is filled with the raw water.

Figure 17:
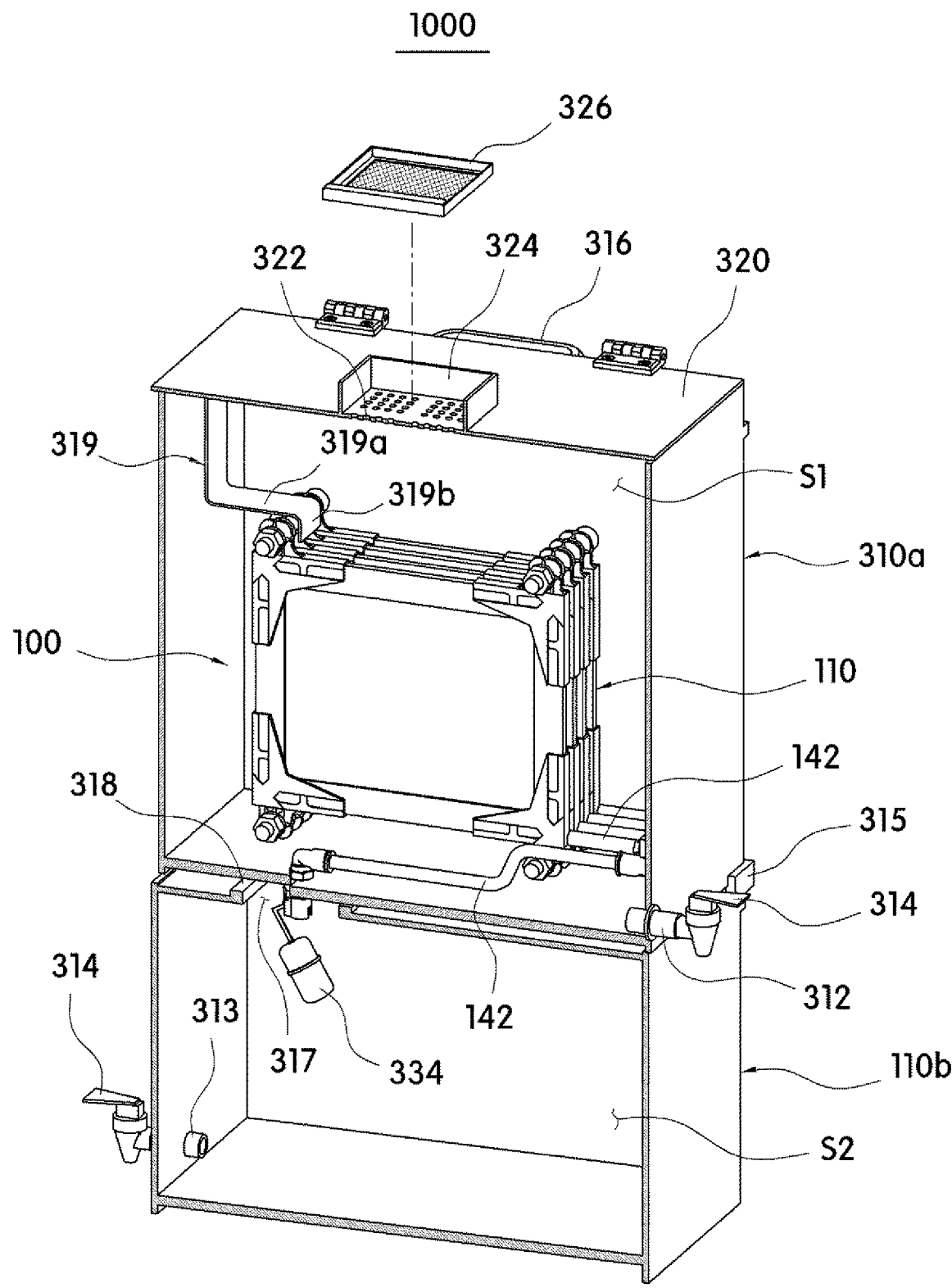
FIG. 17 is a coupled cross-sectional view illustrating one form of an internal configuration applicable to FIG. 15.
Figure 18:
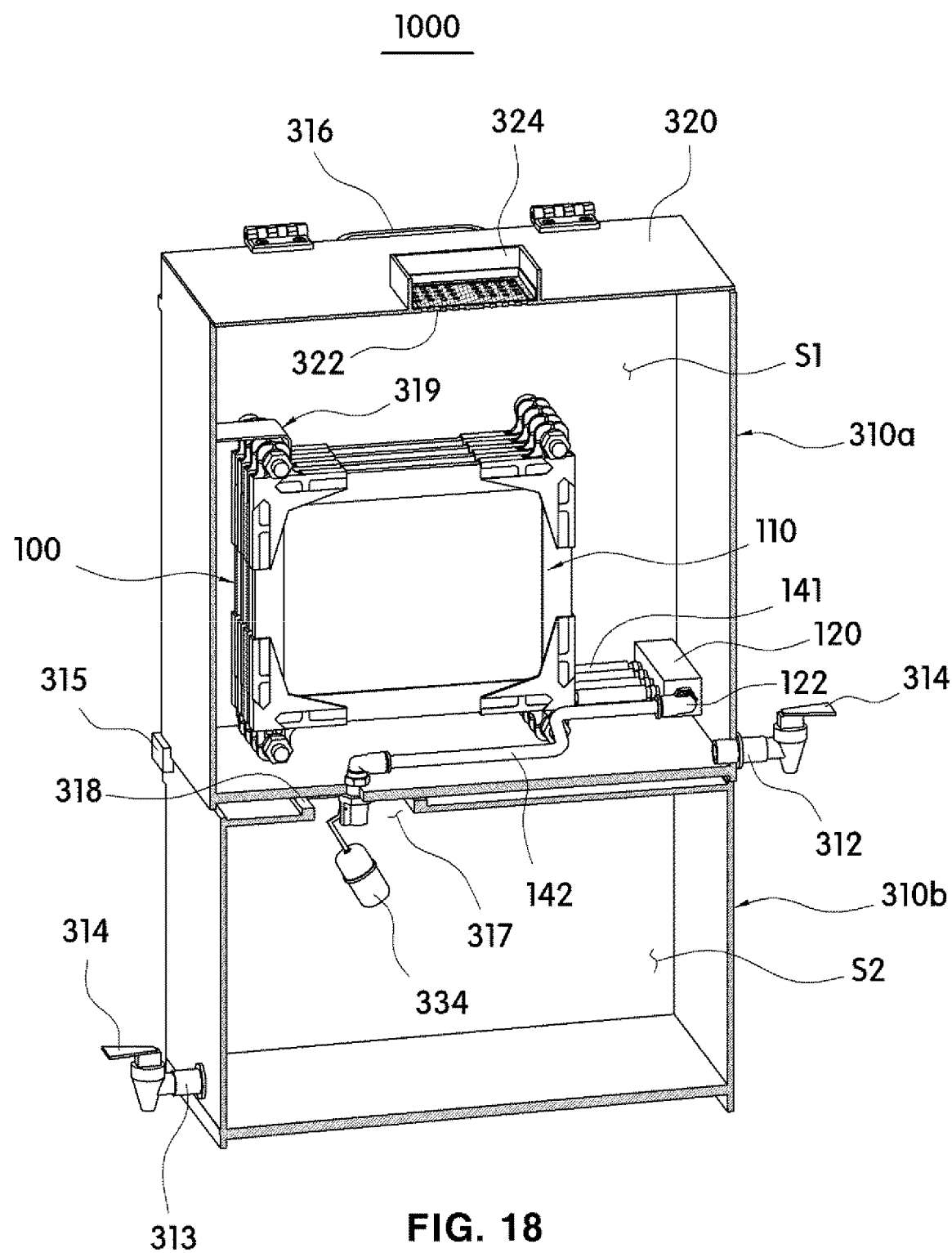
FIG. 18 is a diagram illustrating FIG. 17 when viewed from a different angle.
Figure 19:
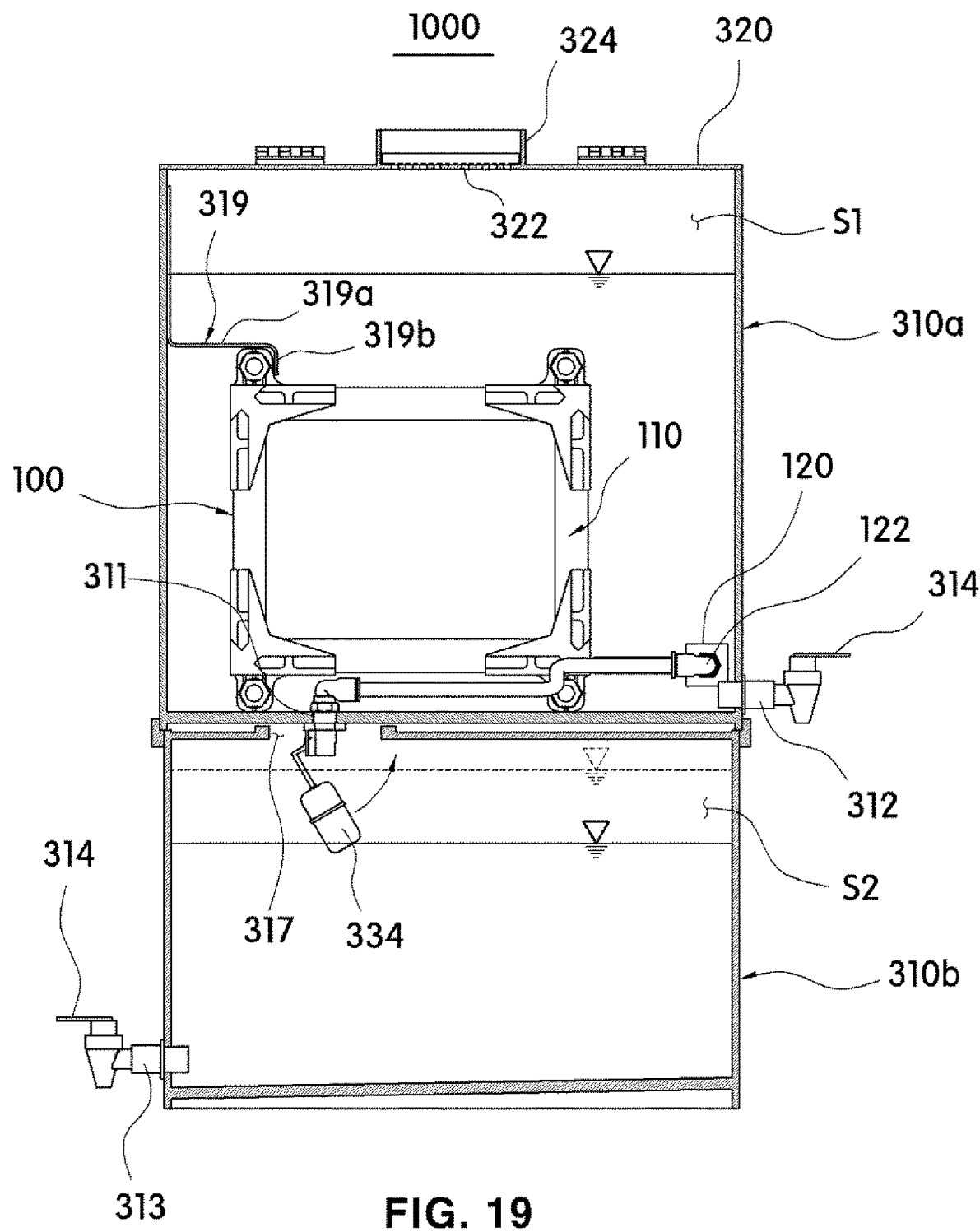
FIG. 19 is a diagram illustrating an operating state of an opening and closing part according to a water level of filtered water stored in a second space of FIG. 17.
Figure 20:
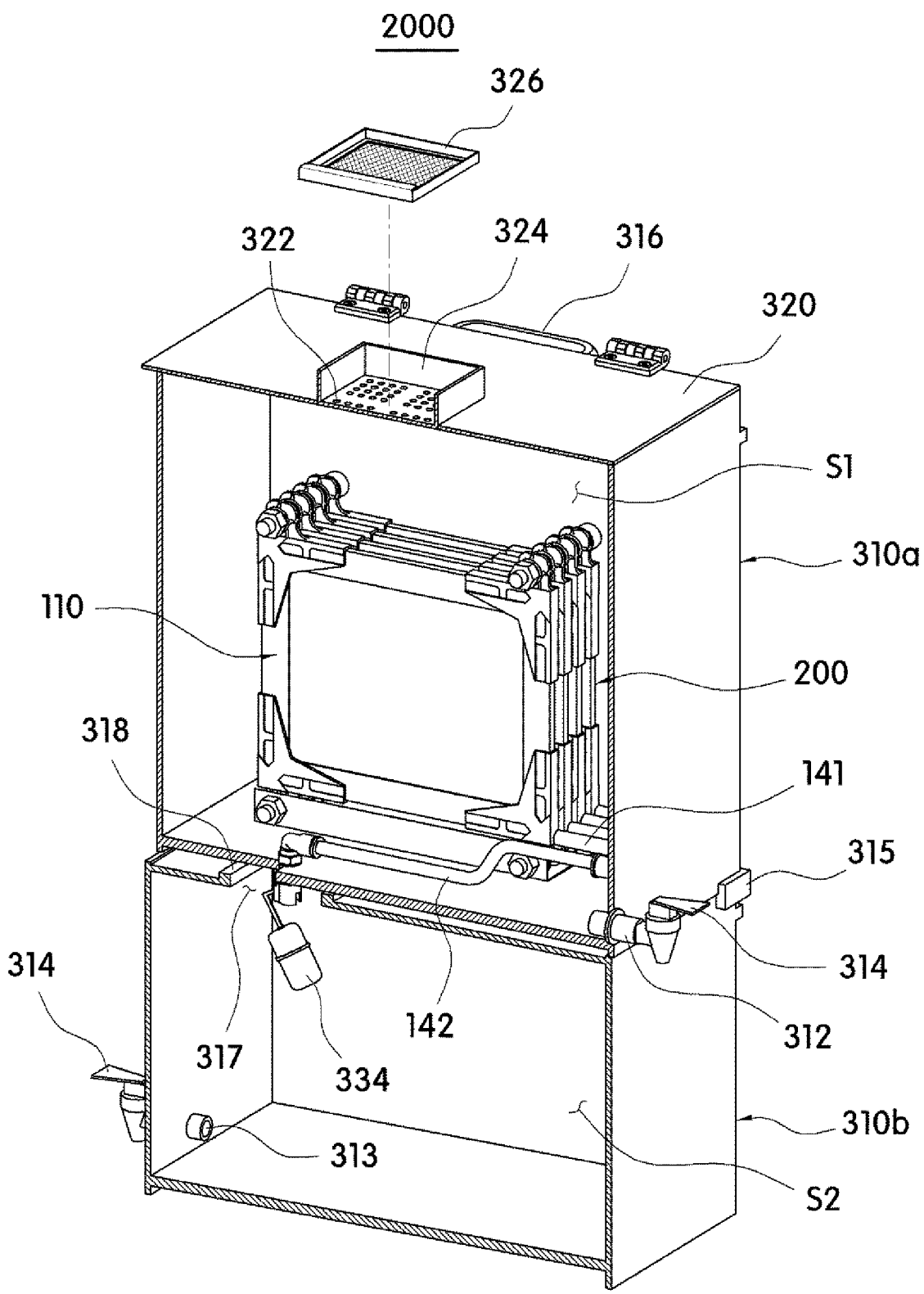
FIG. 20 is a coupled cross-sectional view illustrating an alternative form of the internal configuration applicable to FIG. 15.
Figure 21:
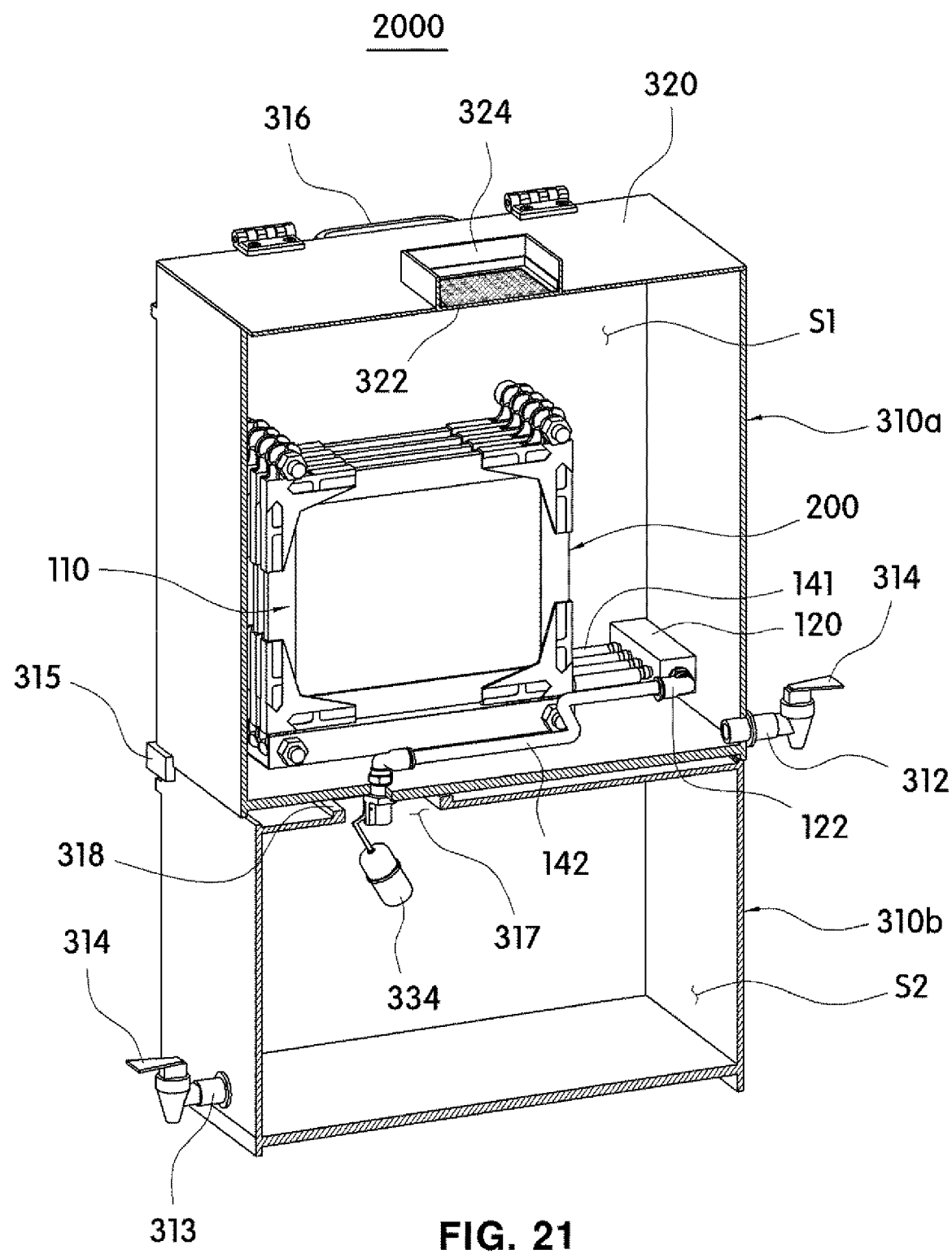
FIG. 21 is a diagram illustrating FIG. 20 when viewed from a different angle.
Figure 22:
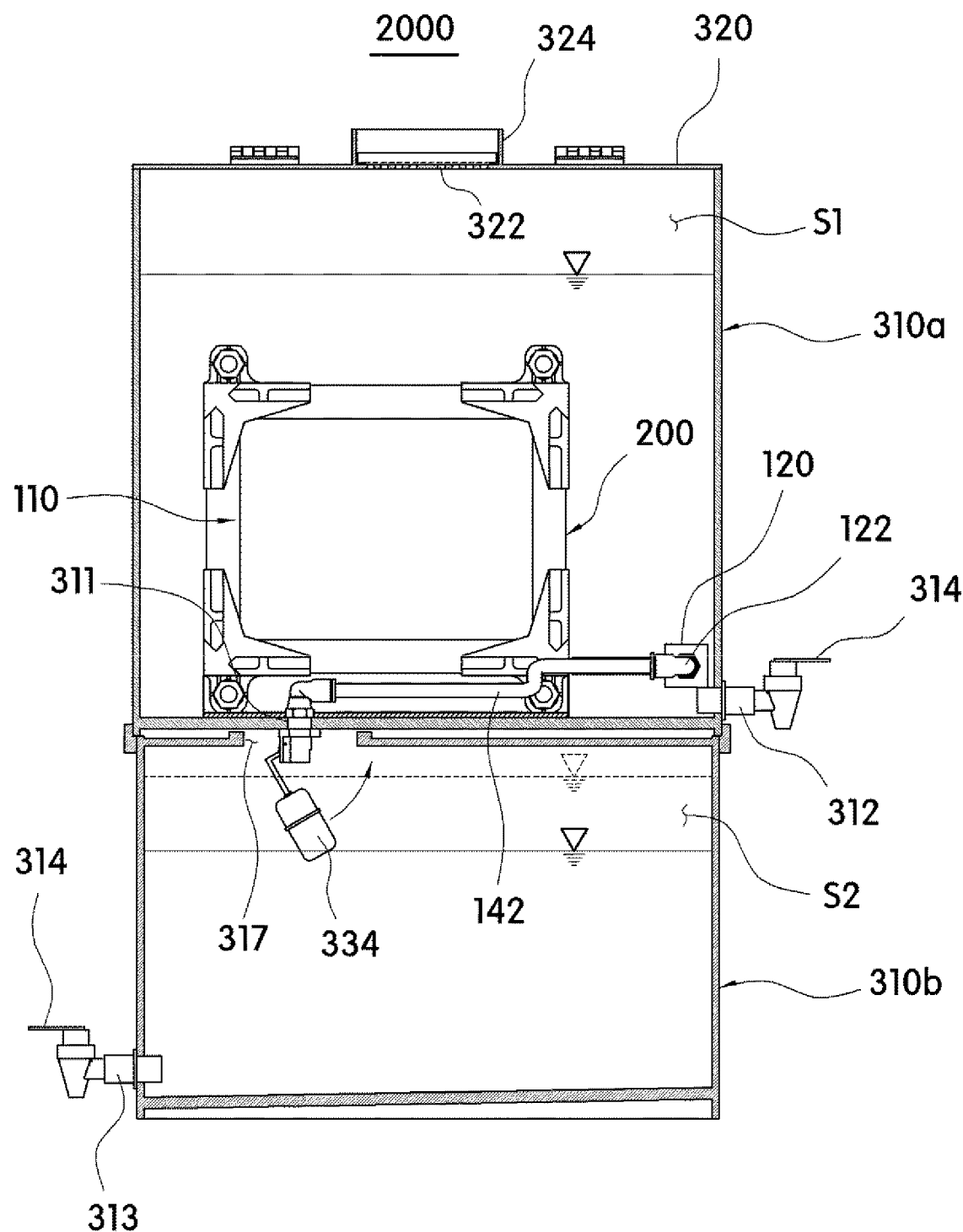
FIG. 22 is a diagram illustrating an operating state of an opening and closing part according to a water level of filtered water stored in a second space of FIG. 20.

Alternatively, when the weighting member 130, 130', or 230 is not included in the filter module 100 applied to the gravity-type water purifier 1000 according to one embodiment of the present invention, a fastener 319 may be provided inside the first housing 310a to prevent the filter module 100 from being moved in the first space S1. That is, as shown in FIGS. 17 to 19, the fastener 319 may include a first fastener 319a extending from an inner surface of the first housing 310a in a direction parallel to the bottom surface of the first housing 310a and include a second fastener 319b extending downward from the first fastener 319a.

Thus, the filter module 100 integrated through the fastening bar 150 may be disposed such that the first fastener 319a and the second fastener 319b are located on upper and side portions of the fastening bar 150 in the first space S1. Consequently, even though the filter module 100 is buoyant due to the raw water stored in the first space S1, the filter module 100 may be prevented from floating due to the binding force provided by the first fastener 319a.

Further, even though the filter module 100 is moved in a horizontal direction along the bottom surface of the first housing 310a, horizontal movement of the filter module 100 may be prevented by the second fastener 319b. Consequently, when a large amount of the raw water is stored in the first space S1, the filter module 100 may be maintained to be in a state of being completely sunk into the raw water, whereas, even though the amount of the raw water stored in the first space S1 is small, the filter module 100 may allow the amount of the raw water in contact with the filter members 110 to be maximized such that the production of the filtered water may be smoothly performed.

Meanwhile, in a state of being disposed in the first space S1, the filter module 100, 200, 300, 400, or 500 may be connected to the outlet 311 formed on the bottom surface of the first housing 310a via a connection tube 142. Thus, the filtered water produced through the filter module 100, 200, 300, 400, or 500 may flow to the second space S2 formed in the second housing 310b through the outlet 311.

In this case, the first housing 310a may be disposed above the second housing 310b. Accordingly, when the outlet 311 is in an open state, the raw water stored in the first space S1 may permeate into the filtration members 111 due to gravity or water pressure. Thus, foreign materials of the raw water may be filtered while the raw water permeates into the filtration members 111 from the outside thereof, and then the raw water may fall to the second space S2 through the outlet 311.

As described above, in the gravity-type water purifier 1000 or 2000 according to one embodiment of the present invention, the filter module 100, 200, 300, 400, or 500 and the first housing 310a storing the raw water may be located above the second housing 310b such that the raw water may permeate into the filtration members 111 of the filter module using natural power generated by water pressure due to gravity or potential energy. In this manner, the filtered water may be produced by not even using additional power such as electricity power so that, even in a harsh environment in which an infrastructure including electricity facilities is not provided or it is difficult to supply electricity, required filtered water may be produced easily.

Meanwhile, a drain outlet 312 communicating with the first space S1 may be formed in one side of the first housing 310a so as to discharge foreign materials separated from the raw water and deposited on the bottom surface of the first housing 310a to the outside or discharge the raw water stored in the first space S1 as necessary.

Further, a filtered water outlet 313 communicating with the second space S2 may be formed in one side of the second housing 310b. When the filtered water stored in the second space S2 is to be used, the filtered water may be drawn through the filtered water outlet 313. In this case, the filtered water outlet 313 may be formed at a position close to a bottom surface of the second housing 310b so as to allow the filtered water stored in the second space S2 to be smoothly discharged due to gravity. The bottom surface of the second housing 310b may be formed as an inclined surface having a predetermined slope so as to the filtered water stored in the second space S2 to smoothly flow toward the filtered water outlet 313. Here, a known opening and closing valve 314 may be provided on each of the drain outlet 312 and the filtered water outlet 313 so that a user may easily change an opened or closed state.

Meanwhile, a cover 320 may be pivotably connected to an upper portion of the first housing 310a to open or close an open upper portion of the first space S1. Thus, when it is necessary to supply the raw water to the first space S1 or to replace the filter module disposed in the first space S1, the cover 320 is opened such that the raw water may be supplied to the first space S1 or the filter module may be easily replaced.

In this case, at least one input hole 322 may be formed to pass through the cover 320 with a predetermined area so as to be able to supply the raw water to the first space S1. Thus, when it is necessary to supply the raw water to the first space S1, the raw water may be supplied to the first space S1 through the input hole 322 without opening the cover 320.

Further, a screen member 324 surrounding the input hole 322 may be formed therearound to have a predetermined height from one surface of the cover 320. Therefore, even though a large amount of the raw water is supplied to the input hole 322 when the raw water is supplied to the first space S1 through the input hole 322, the screen member 324 may prevent the raw water which has not yet passed through the input hole 322 from flowing out such that a supply process of the raw water may be easily performed.

In this case, a mesh strainer 326 may be disposed above the input hole 322 to filter foreign materials contained in the raw water. Thus, when bulky foreign materials including leaves or mud are contained in the raw water, the mesh strainer 326 may filter the bulky foreign materials such that filtration efficiency of the filter module may be improved. The mesh strainer 326 may be detachably coupled to the screen member 324 and may be made of any known material, such as stainless steel or plastic, used as a mesh strainer.

Here, the first housing 310a and the second housing 310b may be integrally formed. Alternatively, the first housing 310a may be detachably coupled to the second housing 310b.

That is, the first housing 310a and the second housing 310b may be integrally formed to constitute the housing 310, and the bottom surface of the first housing 310a or an upper surface of the second housing 310b may serve as a partition wall which partitions the first space S1 from the second space S2 so that the raw water stored in the first space S1 may be separated from the filtered water stored in the second space S2.

Figure 16:
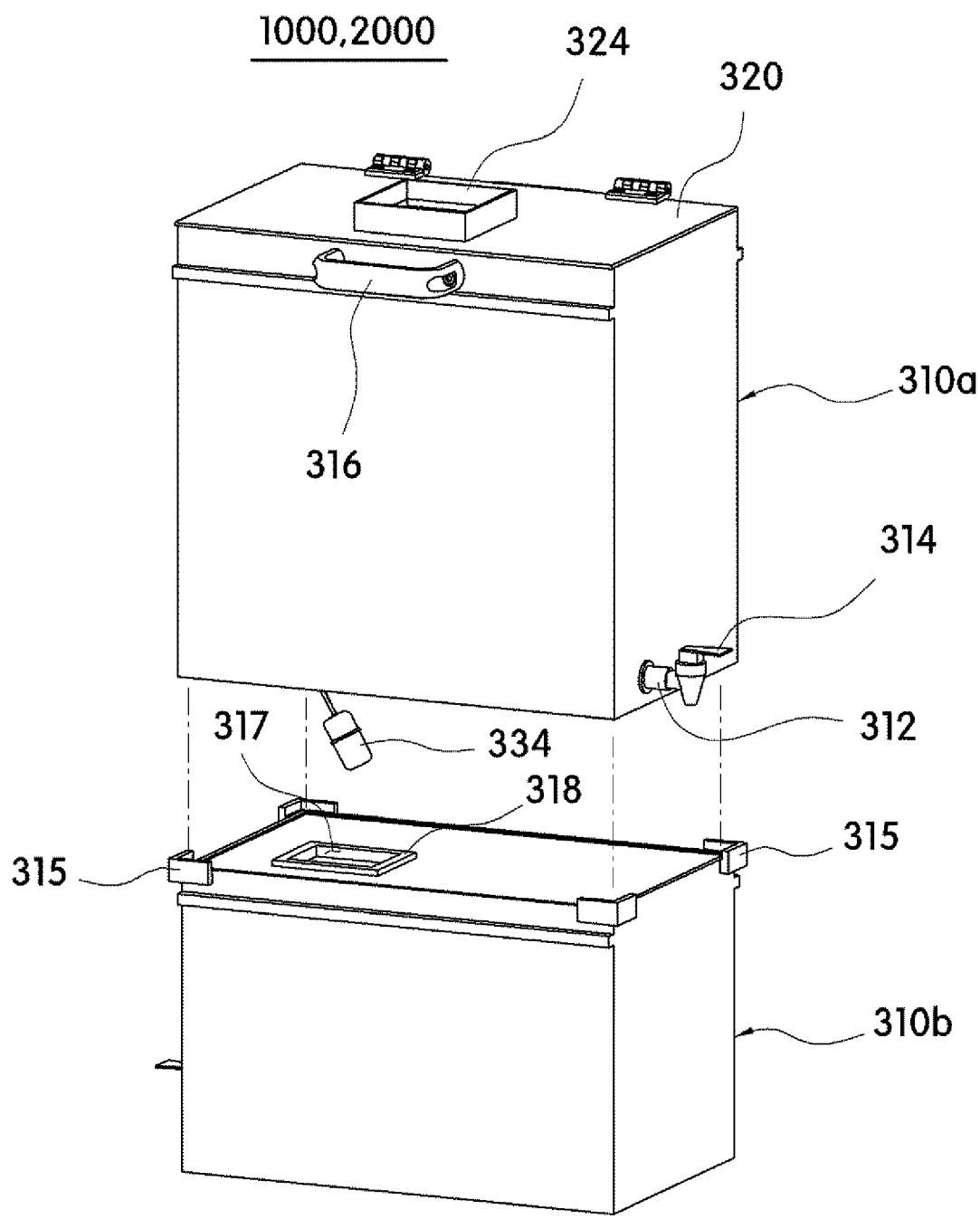
FIG. 16 is a diagram illustrating a state in which a first housing and a second housing are separated in FIG. 15.

Alternatively, the housing 310 may be implemented so that the first housing 310a and the second housing 310b are detachable, or so that the first housing 310a is coupled above the second housing 310b. That is, as shown in FIG. 16, engagement portions 315 may be formed on upper corners of the second housing 310b to support lower corners of the first housing 310a so that the first housing 310a may be coupled above the second housing 310b.

For example, the engagement portions 315 may be formed on the upper corners of the second housing 310b to be substantially "L" shaped. Accordingly, the lower corners of the first housing 310a disposed above the second housing 310b may be pressed against the engagement portions 315 such that the first housing 310a may be easily coupled to the second housing 310b and movement of the first housing 310a in a left-right direction may be prevented by the engagement portions 315. Further, even when it is necessary to partially replace the first housing 310a or the second housing 310b, the first housing 310a is lifted upward and then the lower corners thereof are detached from the engagement portions 315 such that a corresponding housing may be easily replaced.

In the present invention, in a case in which the first housing 310a and the second housing 310b are formed to be detachable, an opening 317 having a predetermined area may be formed to pass through an upper plate of the second housing 310b in a region corresponding to the outlet 311. Thus, the filtered water discharged through the outlet 311 may fall to the second space S2 to be stored therein. Here, a preventing bump 318 having a predetermined height and surrounding an edge of the opening 317 may be formed on the upper plate of the second housing 310b so that an amount of the filtered water stored in the second space S2 may be maximized.

In this case, the outlet 311 may allow or block discharge of the filtered water produced in the filter module 200 through an opening and closing part 330. Herein, the opening and closing part 330 may be automatically operated according to a water level of the filtered water stored in the second space S2 to allow or block the discharge of the filtered water, thereby not requiring separate drive power like electricity.

Figure 23:
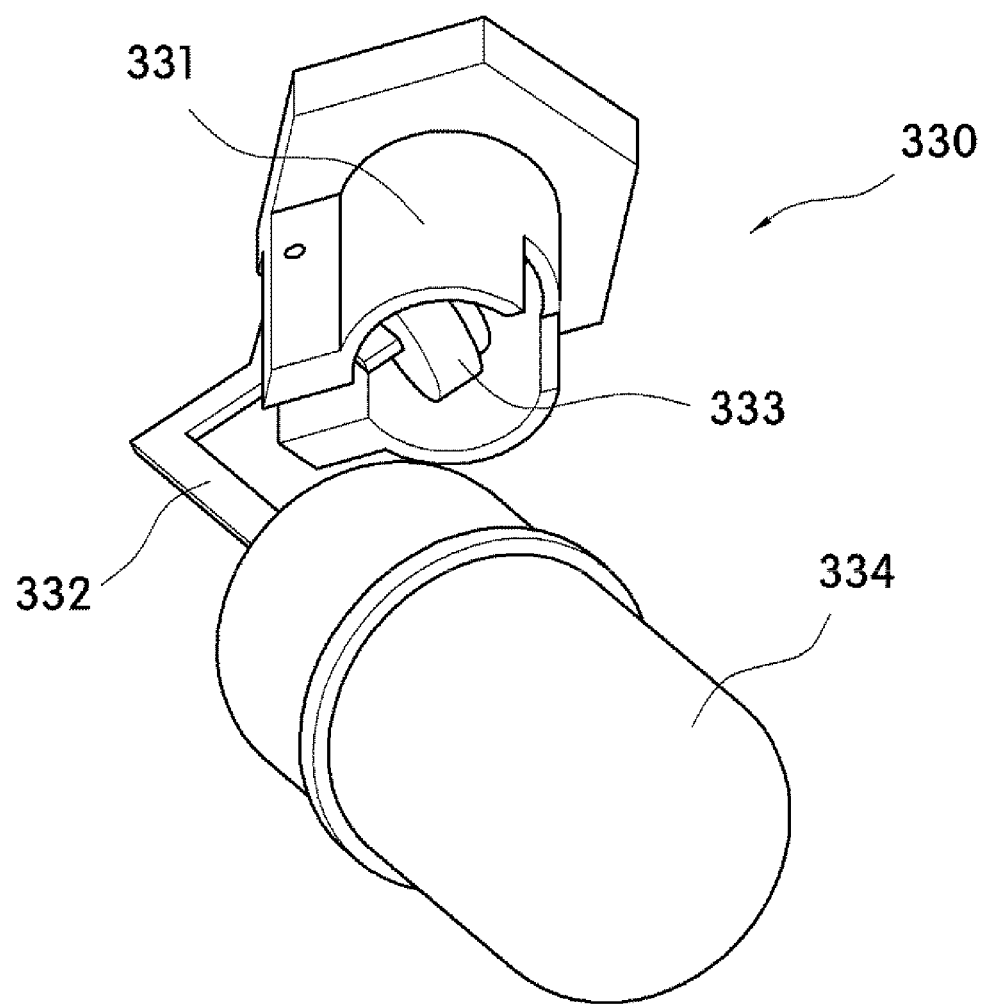
FIG. 23 is a diagram illustrating a coupling relationship between an outlet and an opening and closing part which are applicable to FIG. 15.
Figure 24:
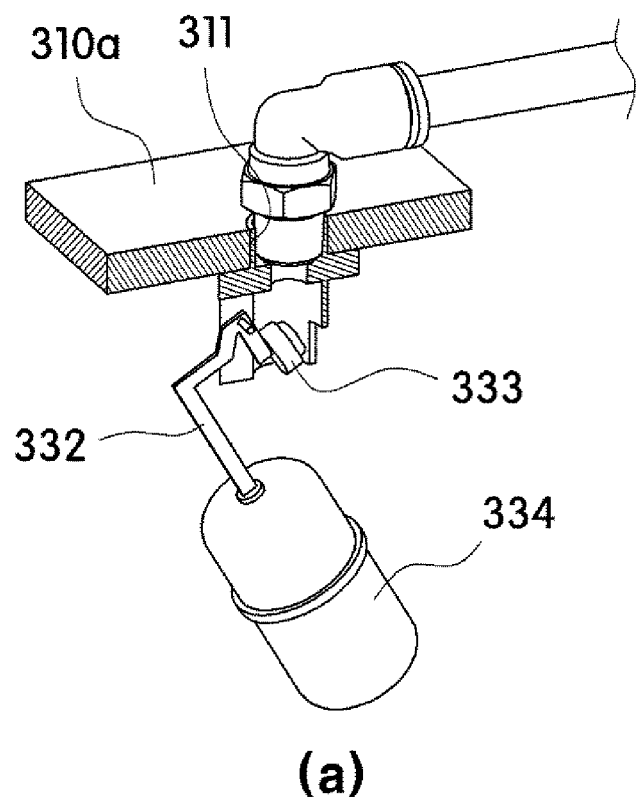
FIG. 24 is a diagram selectively illustrating a bottom surface of the first housing and the opening and closing part so as to show an operating state of the opening and closing part in FIG. 15.
Figure 24:
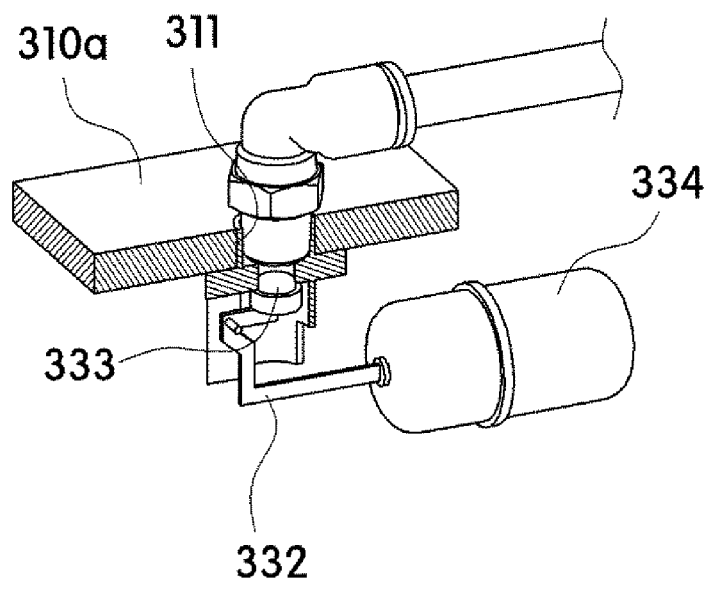

For example, as shown in FIGS. 23 and 24, the opening and closing part 330 may include a hollow tube body 331 engaged with the outlet 311 and include a link member 332 pivotably connected to the tube body 331. A sealing member 333 and a buoyancy member 334 may be fixed to both end portions of the link member 332, respectively.

Here, when the link member 332 is pivoted, the sealing member 333 may be pivoted with the link member 332 to open or block the outlet 311. The buoyancy member 334 may ascend or descend due to buoyancy according to the water level of the filtered water stored in the second space S2. As a result, the buoyancy member 334 may provide a driving force for pivoting the link member 332.

Accordingly, when a small amount of the filtered water flows into the second space S2, the link member 332 of the opening and closing part 330 may pivot downward due to a weight of the buoyancy member 334 such that the outlet 311 may be maintained to be in an open state (see FIG. 24A).

On the contrary, when the filtered water fills in the second space S2 to a predetermined amount, the buoyancy member 334 floats on the filtered water and ascends due to buoyancy as the water level of the filtered water stored in the second space S2 rises such that the link member 332 may be pivoted upward (see FIG. 24B).

Accordingly, the sealing member 333 fixed to the end portion of the link member 332 covers the outlet 311 to change the open state of the outlet 311 to a closed state so that an inflow of the filtered water produced through the filter module 100, 200, 300, 400, or 500 to the second space S2 may be blocked.

As described above, when the amount of the filtered water accommodatable in the second space S2 is filled, the gravity-type water purifier 1000 or 2000 according to the present invention may change the open state of the outlet 311 to the closed state through the opening and closing part 330 to interrupt the production of the filtered water through the filter module such that the raw water or the produced filtered water may be prevented from being unnecessarily discarded.

As another example, as shown in FIG. 25, the gravity-type water purifier 3000 may be configured such that the housing 410 has the single inner space S.

In the present embodiment, the housing 410 may be implemented in a large-capacity size so as to allow the operator to pass into or out of the housing 410. As a specific example, the housing 410 may be a rainwater storage tank installed on a rooftop of a building or on the ground.

In this case, the filter module 600 disposed in the inner space S of the housing 410 may be one, and alternatively, may be implemented as a modularized shape in which a plurality of filter modules 200 are connected to each other. Further, a filtered water outlet 413 communicating with the inner space S may be formed on one side of the housing 410 so that filtered water which is produced from the filter module 600 may be discharged to the outside. A known opening and closing valve 414 may be provided in the filtered water outlet 413 to allow a user to easily change an open or closed state of the filtered water outlet 413. Here, the filtered water outlet 413 may be formed at a position close to a bottom surface of the housing 410 so as to allow the filtered water which is produced from the filter module 600 to be smoothly discharged due to gravity.

Accordingly, in a state in which the filtered water outlet 413 is open, foreign materials are filtered while the raw water permeates into the filtration members 111 due to gravity or water pressure, and then the filtered water may be produced from the filter module 600 and be discharged to the outside through the filtered water outlet 413.

As described above, in the gravity-type water purifier 3000 according to one embodiment of the present invention, when the filtered water outlet 413 is open, the raw water may permeate into the filtration members 111 using natural power generated by water pressure due to gravity or potential energy.

As a result, the filtered water may be produced by not even using additional power such as electricity power so that, even in a harsh environment in which an infrastructure including electricity facilities is not provided or it is difficult to supply electricity, desired filtered water may be produced easily.

In this case, the filter module 600 may be configured such that a plurality of filter modules 100, 200, 300, 400, or 500, in which the plurality of filter members 110 are fixed via the fastening bar 150, are connected. For example, as shown in FIGS. 25 to 27, the gravity-type water purifier 3000 according to the present embodiment may be configured such that two filter modules 100, 200, 300, 400, or 500 may be connected via a bracket 430 and the filtered water collecting member 420 is fixed to the bracket 430. Further, two water collecting portions 114 may be formed in each of the filter members 110 constituting the filter module 100, 200, 300, 400, or 500. The two water collecting portions 114 may be connected to a single common water collecting member 120 included in the filter module 100, 200, 300, 400, or 500. Furthermore, when the filter module 200, 300, 400, or 500 includes the weighting member 130 and 130', the common water collecting member 120 may be fixed to one side of the weighting member 130 or 130'.

Here, the filtered water collecting member 420 may collect and integrate the filtered water produced from each of the filter modules 100, 200, 300, 400, or 500. That is, the filtered water collecting member 420 may be connected to the water collecting portion 120 included in each of the filter modules 100, 200, 300, 400, or 500 such that the filtered water produced from each of the filter modules 100, 200, 300, 400, or 500 may be collected.

The filtered water collecting member 420 may include a plurality of inlets 421 and at least one outlet 422. The plurality of inlets 421 may each be connected to the common water collecting member 120, and the outlet 422 may be connected to the filtered water outlet 413 formed on one side of the housing 410.

Thus, the filtered water which is produced from each of the filter modules 100, 200, 300, 400, or 500 may flow to each of the common water collecting members 120 through the two water collecting portions 114, be collected through the filtered water collecting member 420, and then be discharged to the outside through the filtered water outlet 413.

In the present embodiment, although the two filter modules 100, 200, 300, 400, or 500 have been shown as being connected in the inner space S in the drawings, the present invention is not limited thereto, and it is noted that the total number of the filter modules 100, 200, 300, 400, or 500 may be suitably changed according to an overall capacity of the raw water which will be stored in the inner space S.

Meanwhile, although the filter module 100 or 200 shown in FIGS. 1 and 3 has been illustrated as being disposed in the first space S1 or the inner space S, the present invention is not limited thereto, and all of the filter module 100, 200, 300, 400, or 500 shown in FIGS. 1 to 7 may be applied.

Further, although the filter members 110 constituting the filter module 100, 200, 300, 400, or 500 have been exemplarily described as being in the form of a flat plate, the present invention is not limited thereto, and it is noted that various known filter members may be employed and the structure of the filter member 110 may be appropriately modified.

In particular, the support frame disposed on the edge of the filtration member 111 to support the filtration member 111 in a plate form may be omitted. For example, it is noted that, when the filtration member 111 is implemented in the above-described three-layer or five-layer structure, the filtration member 111 may be configured such that the pair of nanofiber webs 111c disposed on both surfaces of the first support 111a, or the nanofiber web 111c and second support 111b disposed thereon, are each formed to have an area that is relatively wider than that of the first support 111a, and then portions protruding from the edge of the first support 111a are brought into contact with each other.

Meanwhile, a gravity-type water purifier 4000 according to one embodiment of the present invention may be configured such that filter members 210 which produce filtered water are individually installed on the bottom surface of the first housing 310a.

Figure 28:
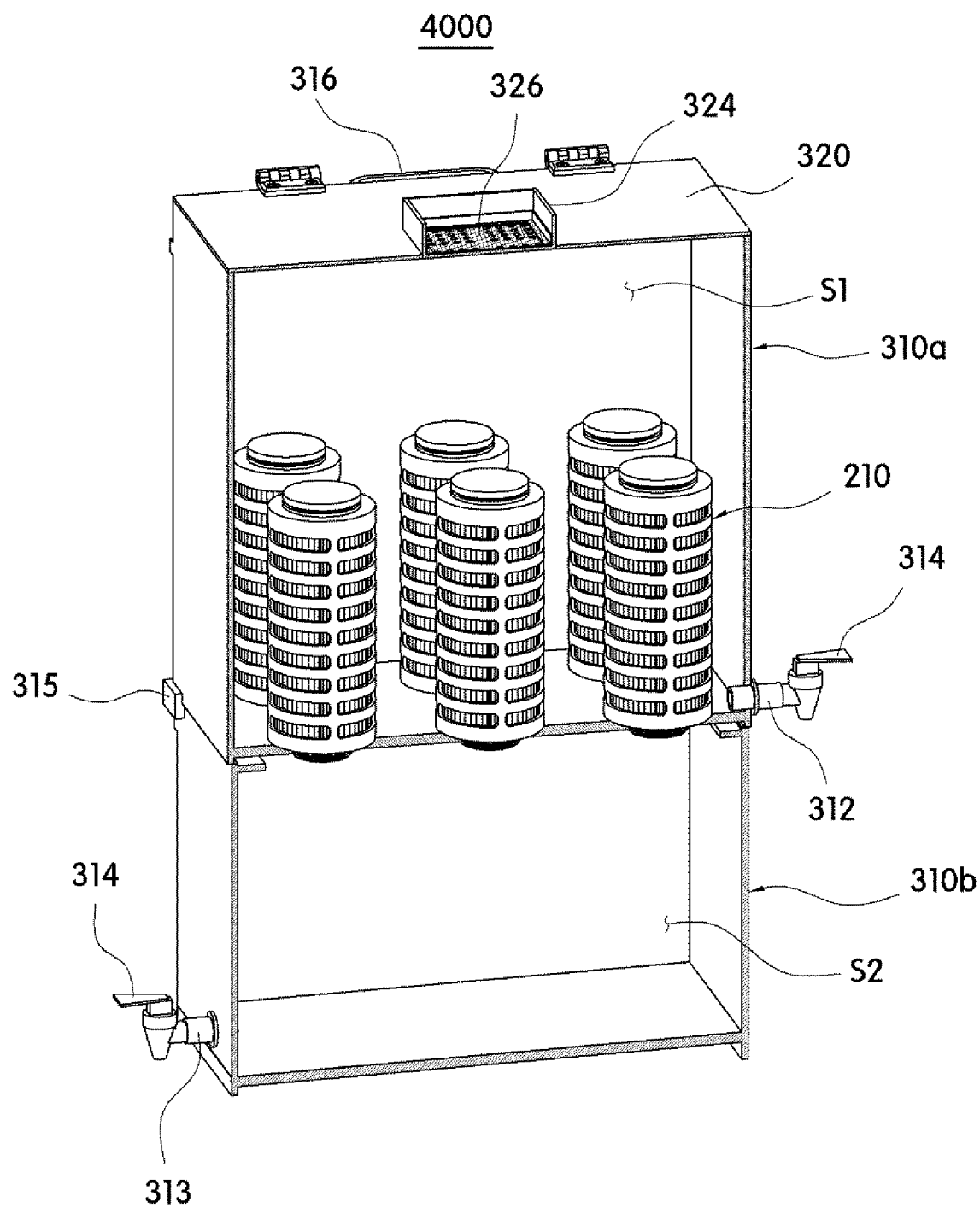
FIG. 28 is a diagram illustrating an incised state of a portion of a housing in a gravity-type water purifier according to still another embodiment of the present invention.
Figure 29:
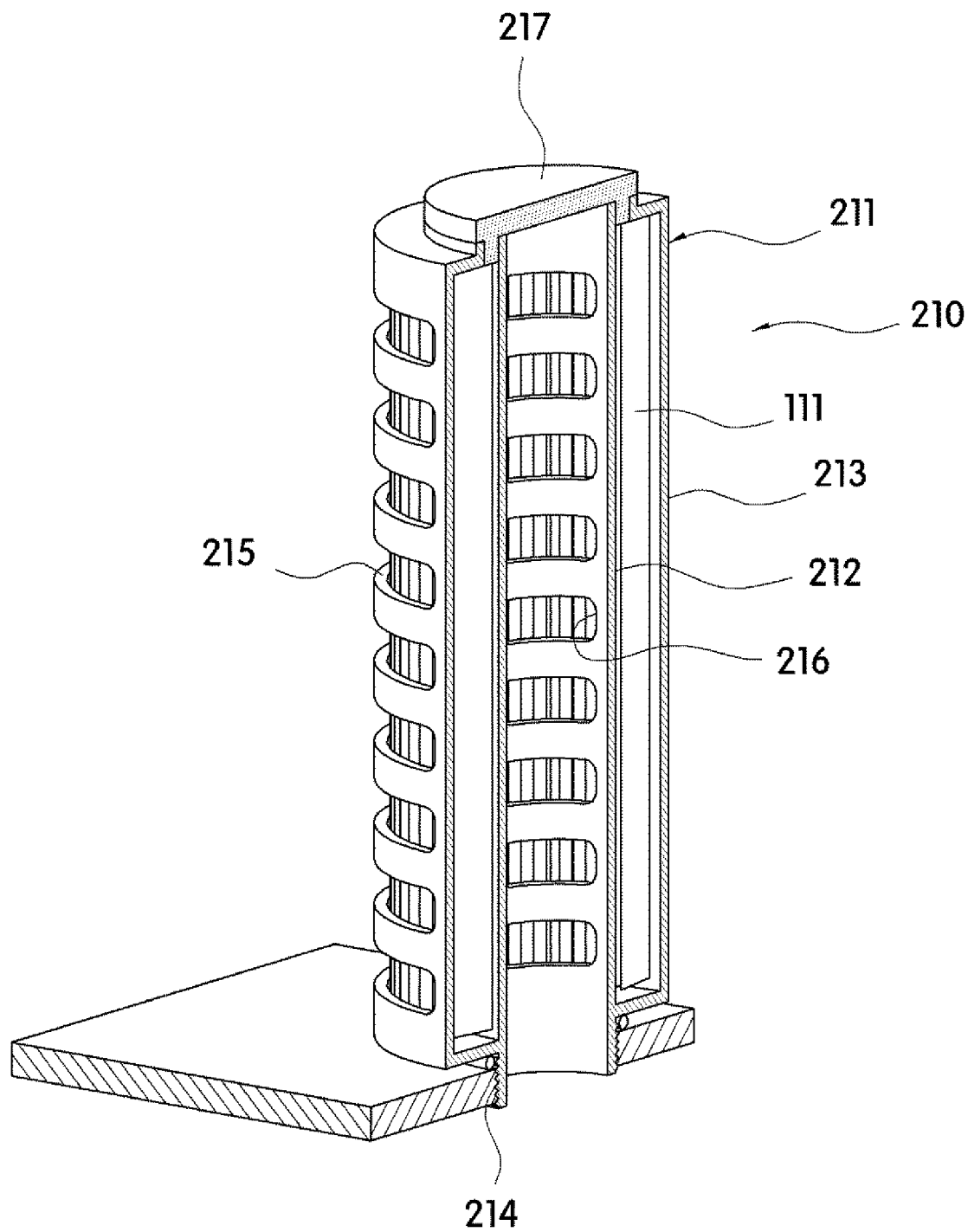
FIG. 29 is a cross-sectional view of a filtration member applicable to FIG. 28.

For example, as shown in FIGS. 28 to 29, the filter members 210 may each be configured such that a plate-shaped filtration member 111 is embedded in a hollow case 211. In this case, the housing 310 may include the first housing 310a having the first space S1 in which the raw water is stored, and the second housing 310b having the second space S2 in which the filtered water is stored.

In this case, the filter members 210 may each be disposed in the first space S1 in which the raw water is stored, and one side of each of the filter members 210 may be installed on the bottom surface of the first housing 310a such that the filter members 210 may each be partially or entirely sunk in the raw water. Further, the first housing 310a may be disposed above the second housing 310b. Accordingly, the raw water may permeate into the filter members 210 due to natural power generated by water pressure resulting from gravity or potential energy. In this manner, the filtered water may be produced by not even using additional power such as electricity power so that, even in a harsh environment in which an infrastructure including electricity facilities is not provided or it is difficult to supply electricity, desired filtered water may be produced easily.

Specifically, the case 211 may include a hollow inner wall 212 and an outer wall 213 which are disposed to be spaced a gap apart from each other, and the filtration member 111 may be inserted between the inner wall 212 and the outer wall 213. In this case, a plurality of through-holes 215 and 216 may be formed to pass through the inner wall 212 and the outer wall 213 so as to allow the raw water to flow into the filtration member 111 or the filtered water produced through the filtration member 111 to flow to a hollow portion of the case 211. Further, the protrusion 214 may be formed on a lower end of the case 211 to be engaged with the outlet 311 formed on the bottom surface of the first housing 310a such that the case 211 may be detachably coupled to the outlet 311.

Here, the protrusion 214 may be engaged with the outlet 311 through a press-fitting method or a screwing method and may be formed in a hollow shape so as to communicate with the hollow portion of the case 211. Accordingly, the filtered water which is produced through the filtration member 111 may flow to a central portion of the case 211 through the through-holes 216 formed in the inner wall 212 and then fall to the second space S2 through the protrusion 214.

In the present embodiment, a known filtration member may be employed as the filtration member 111. However, as described above, the filtration member 111 may be configured such that at least one-layer nanofiber web 111c is formed on one or both surfaces of at least one support 111a or 111b made of a porous base material. The nanofiber web 111c may be configured such that the first nanofiber web 111d coated with an antimicrobial material and the second nanofiber web 111e not containing an antimicrobial material are stacked. Further, the filtration member 111 disposed inside the case 211 may have a form of being simply wound along the inner wall 212 of the case 211. Alternatively, the filtration member 111 may be formed in a corrugated shape bent in a zigzag manner so as to increase a contact area with the raw water. Furthermore, a cover member 217 may be detachably coupled to an upper side of the case 211 to seal an upper portion of the outer wall 213 and/or the inner wall 212 such that the raw water may be blocked from flowing into the hollow portion of the case 211.

In addition, the first housing 310a and the second housing 310b of the present embodiment may each have a form in which the structure of the housing 310 employed in the above-described gravity-type water purifier 1000 or 2000 is appropriately modified. That is, the opening and closing part 330 described in the above embodiments may be omitted or included. Further, in the present embodiment, the upper surface of the second housing 310b may be modified into an open form, and other configurations such as the handgrip 316, the cover 320, and the like may be employed in the same manner.

Although the embodiments of the present invention have been described, the spirit of the present invention is not limited to these embodiments disclosed herein, and it should be understood that numerous other embodiments can be devised by those skilled in the art that will fall within the same spirit and scope of this disclosure through addition, modification, deletion, supplement, and the like of a component, and also these other embodiments will fall within the spirit and scope of the present invention.

The invention claimed is:

1. A filter module for a gravity-type water purifier, comprising:
    a plurality of filter members formed in a flat plate shape, disposed in parallel to be spaced an interval apart from each other, and fixed to each other via at least one fastening bar having a first end and a second end, wherein each of the plurality of filter members comprises a filtration material;
a common water collecting member to which water collecting portions formed in each of the plurality of filter members are connected and in which filtered water produced from each of the plurality of filter members is collected; and
a weighting member coupled to the at least one fastening bar, wherein the weighting member is configured to increase an overall weight of the filter module to maintain the filter module in a sunk state or a submerged state on a bottom surface of an inner space of the gravity-type water purifier filled with a raw water, wherein the weighting member comprises:
a plate-shaped first plate having a predetermined area, a top surface, an opposing bottom surface, a first side wall, and an opposing second side wall, wherein the first and second side walls each extend upward from the top surface,
wherein the first side wall is engaged with the first end of the fastening bar and the second side wall is engaged with the second end of the fastening bar,
wherein the top surface of the first plate is disposed under the plurality of filter members, and wherein the first plate has a plurality of through-holes so that raw water can pass through during sinking of the filter module,
wherein the plurality of through-holes are formed to pass through the weighting member, and
wherein the entirety of the weighting member is positioned below the filtration material.

2. The filter module of claim 1, wherein the weighting member is disposed to surround a lower side of the plurality of filter members.

3. The filter module of claim 1, wherein each of the plurality of filter members includes:
a support frame coupled to an edge of the filtration material so as to support the filtration material and having a flow path through which filtered water produced through the filtration material flows, and
wherein the filtration material comprises a plate shaped filtration material having a predetermined area.

4. The filter module of claim 3, wherein the filtration material includes:
a plate-shaped first support having a predetermined area; and
a pair of nanofiber webs configured such that nanofibers are formed on both surfaces of the first support.

5. The filter module of claim 4, wherein each of the pair of nanofiber webs includes:
a first nanofiber web having a surface coated with an antimicrobial material; and
a second nanofiber web stacked on one surface of the first nanofiber web.

6. The filter module of claim 4, wherein a second support is interposed between the nanofiber web and the first support.

7. A gravity-type water purifier comprising:
a housing having an inner space in which raw water is stored; and
at least one filter module according to claim 1 disposed in the inner space to filter foreign materials contained in the raw water,
wherein the raw water flows into the plurality of filter members due to gravity and the foreign materials are filtered such that filtered water is produced.

8. The gravity-type water purifier of claim 7, wherein the housing includes a cover configured to open or close an open upper portion of the inner space.

9. The gravity-type water purifier of claim 8, wherein:
the cover includes at least one input hole formed to pass through the cover with a predetermined area so as to supply the raw water to the inner space; and
a mesh strainer configured to filter the foreign materials contained in the raw water is disposed above the input hole.

10. The gravity-type water purifier of claim 7, wherein the housing includes:
a first housing having a first space in which the raw water is stored and the filter module is disposed; and
a second housing having a second space in which the filtered water produced through the filter module is stored, and
the filter module is connected to an outlet formed on a bottom surface of the first housing such that the filtered water discharged through the outlet is stored in the second space.

11. The gravity-type water purifier of claim 10, wherein a fastener formed to protrude from an inner surface of the housing to prevent movement of the filter module is provided in the first space.

12. The gravity-type water purifier of claim 10, wherein:
an opening in which the outlet is disposed is formed on an upper portion of the second housing; and
the outlet is opened or closed by an opening and closing part which is pivoted according to a water level of the filtered water stored in the second space.

13. The gravity-type water purifier of claim 12, wherein the opening and closing part includes:
a buoyancy member pivotably coupled to the outlet via a link member to ascend or descend according to the water level of the filtered water; and
a sealing member connected to an end portion of the link member.

14. The gravity-type water purifier of claim 7, wherein:
a plurality of filter modules are provided and disposed in the inner space; and
common water collecting members included in each of the plurality of filter modules are connected one-to-one to a single filtered water collecting member.

15. A filter module for a gravity-type water purifier, comprising:
a plurality of filter members formed in a flat plate shape, disposed in parallel to be spaced an interval apart from each other, and fixed to each other via at least one fastening bar;
a common water collecting member to which water collecting portions formed in each of the plurality of filter members are connected and in which filtered water produced from each of the plurality of filter members is collected; and
a first and second weighting member each coupled to the fastening bar and each configured to increase an overall weight of the filter module for a gravity-type water purifier to allow the filter module for a gravity-type water purifier to be easily maintained to be in a sunk state or a submerged state on a bottom surface of an inner space of the gravity-type water purifier filled with a raw water,
wherein each of the first and second weighting member is formed of a mesh net having a plurality of through-holes to filter out large-sized foreign materials contained in the raw water before the raw water flows into the filter member and is engaged with the fastening bar such that the fastening bar passes through the first and second weighting members, and wherein the first weighting member and the second weighting member are positioned opposite one another and the plurality of filter members are positioned between the first and second weighting members.

\* \* \* \* \*